(12) United States Patent
Towfiq et al.

(10) Patent No.: US 11,362,744 B2
(45) Date of Patent: Jun. 14, 2022

(54) NOISE DETECTION AND LOCALIZATION

(71) Applicant: Promptlink Communications, Inc., Oceanside, CA (US)

(72) Inventors: Foad Towfiq, Oceanside, CA (US); Ivan Kyryliuk, Kyiv (UA); Alexander Podarevsky, Oceanside, CA (US); Iurii Zhuk, Cherkasy (UA); Antonin Shtikhlaytner, Kiev (UA); Andriy Zhuravlov, Kiev (UA)

(73) Assignee: Promptlink Communications, Inc., Oceanside, CA (US)

( * ) Notice: Subject to any disclaimer, the term of this patent is extended or adjusted under 35 U.S.C. 154(b) by 113 days.

(21) Appl. No.: 16/799,716

(22) Filed: Feb. 24, 2020

(65) Prior Publication Data
US 2020/0274628 A1 Aug. 27, 2020

Related U.S. Application Data

(60) Provisional application No. 62/972,550, filed on Feb. 10, 2020, provisional application No. 62/908,306, filed on Sep. 30, 2019, provisional application No. 62/809,676, filed on Feb. 24, 2019.

(51) Int. Cl.
 *H04B 17/336* (2015.01)
(52) U.S. Cl.
 CPC ................................ *H04B 17/336* (2015.01)
(58) Field of Classification Search
 CPC ....................................................... H04B 17/336
 See application file for complete search history.

(56) References Cited

U.S. PATENT DOCUMENTS

| 5,280,521 | A  | * | 1/1994  | Itoh ..................... H04W 60/00 455/12.1 |
| 6,785,292 | B1 |   | 8/2004  | Vogel |
| 8,559,371 | B2 | * | 10/2013 | Wu ........................ H04L 5/006 370/328 |
| 9,960,951 | B1 |   | 5/2018  | Cruickshank et al. |
| 2009/0323903 | A1 | * | 12/2009 | Cioffi ................... H04B 1/1027 379/32.01 |
| 2014/0310605 | A1 | * | 10/2014 | Basile .................... H04L 41/22 715/736 |
| 2018/0367852 | A1 |   | 12/2018 | Bernstein et al. |

FOREIGN PATENT DOCUMENTS

EP    3334092 A1    6/2018

OTHER PUBLICATIONS

International Preliminary Report on Patentability received for PCT Patent Application No. PCT/US2020/019540, dated Sep. 2, 2021, 15 pages.
International Search Report and Written Opinion received for PCT Patent Application No. PCT/US2020/019540, dated Sep. 27, 2020, 20 pages.
Invitation to Pay Addition Fees and Partial International Search Report received for PCT Patent Application No. PCT/US2020/019540, dated Jun. 8, 2020, 16 pages.

* cited by examiner

*Primary Examiner* — Duc C Ho
(74) *Attorney, Agent, or Firm* — Dentons US LLP

(57) ABSTRACT

Various techniques include detecting noise in a network, identifying the type of noise in the network, localizing noise in the network, determining noise scores for network devices, and/or determining likelihoods that particular devices are causing noise and/or are in proximity of a point of entry of noise into the network.

126 Claims, 18 Drawing Sheets

200 ⤴

206
Identify a plurality of suspect devices based on respective devices of the plurality of devices meeting a set of one or more suspect criteria, including:

216
An upstream an NMTER criterion that is met for the respective device when a determined NMTER value for the respective device exceeds an NMTER threshold.

218
An NMTER standard deviation criterion that is met for the respective device when a determined NMTER standard deviation value for the respective device exceeds an NMTER standard deviation threshold.

220
An NMTER a power level-to-NMTER correlation criterion that is met for the respective device when a determined power level-to-NMTER correlation value for the respective device exceeds a power level-to-NMTER correlation threshold.

222
An NMITE criterion that is met for the respective device when a determined NMITE value for the respective device exceeds an NMITE threshold.

224
An SNR criterion that is met for the respective device when a determined SNR value for the respective device does not exceed an SNR threshold.

226
An SNR standard deviation criterion that is met for the respective device when a determined SNR standard deviation value for the respective device exceeds an SNR standard deviation threshold.

228
A CER criterion that is met for the respective device when a determined CER value for the respective device exceeds a CER threshold.

702
Concurrently displaying a graphical representation of a network quality metric graphed against a first duration of time for a signal and a map of an area

704
The map includes: one or more geographical elements of the area that are not network devices and a plurality of network devices.

706
While displaying the graphical representation of the network quality metric for the signal, receiving input selecting a first time that is within the first duration of time.

708
In response to receiving the input selecting the first time, updating the map of the area to change a visual characteristic of at least some of the displayed plurality of network devices based on a respective noise score for the corresponding network devices at the selected first time.

902
concurrently displaying a graphical representation of a network quality metric graphed against a first duration of time for a signal and a map of an area.

904
The map includes: one or more geographical elements of the area that are not network devices and a plurality of network devices.

906
While displaying the graphical representation of the network quality metric for the signals, receiving first input selecting a first time that is within the first duration of time.

908
In response to receiving the first input, displaying a first visual indicator corresponding to the first time in the graphical representation of the network quality metric.

910
While displaying the graphical representation of the network quality metric for the signals, receiving second input selecting a second time, different from the first time, that is within the first duration of time.

912
In response to receiving the second input, displaying a second visual indicator corresponding to the second time in the graphical representation of the network quality metric.

NOISE DETECTION AND LOCALIZATION

CROSS-REFERENCE TO RELATED APPLICATIONS

This application claims priority to U.S. Provisional Patent Application Ser. No. 62/809,676, entitled "UPSTREAM NOISE DETECTION AND LOCALIZATION" filed on Feb. 24, 2019, U.S. Provisional Patent Application Ser. No. 62/908,306, entitled "NOISE DETECTION AND LOCALIZATION" filed on Sep. 30, 2019, and U.S. Provisional Patent Application Ser. No. 62/972,550, entitled "NOISE DETECTION AND LOCALIZATION" filed on Feb. 10, 2020, the contents of which are hereby incorporated by reference in their entirety.

FIELD

The present disclosure relates generally to analysis of noise, and more specifically to noise detection and localization.

BACKGROUND

Service providers (e.g., operators) provide customers (e.g., subscribers with services, such as multimedia, audio, video, telephony, data communications, wireless networking, and wired networking. Service providers provide such services by deploying one or more electronic devices at their customers' premises, and then connecting the deployed electronic device to the service provider's network or infrastructure. The deployed electronic devices are often called. Customer Premise Equipment (CPE). For example, a cable company delivers media services to customers by connecting an electronic device, such as a set-top box or a cable modem, located at customer's premise to the cable company's network. This CPE is the device that the service provider uses to deliver the service to the customer.

Networks, such as those maintained by service providers or their customers, may have noise cause by impairments, which can cause service degradation and customer dissatisfaction. Examples of impairments include loose or corroded connectors, damaged cables, and flooded amplifiers. Over time, as the network ages, the severity and number of impairments increase. Service providers face challenges in identifying the type of noise in the network and localizing the noise in the network to fix the impairments in a timely manner so as to limit the impacts of service degradation or outage of their customers.

BRIEF SUMMARY

Some techniques for identifying and prioritizing impairments of a network, however, are unreliable or inaccurate. For example, some techniques do not identify certain types of impairments. For another example, some techniques do not prioritize the repair of impairments based on the severity of the impairments and/or the number of affected customers.

In accordance with some embodiments, a method for noise analysis in a network is described. The method comprises: determining, for a first plurality of devices on the network, upstream SNR (and/or CER) values for a plurality of upstream channels; identifying a noisy upstream channel based on whether channels of the plurality of upstream channels meet a noisy channel criteria; and identifying a plurality of suspect devices based on respective devices of the plurality of devices meeting a set of one or more suspect criteria, wherein the plurality of suspect devices is less than the first plurality of devices, and wherein the set of one or more suspect criteria includes a channel criterion that is met for a respective device when the respective device has communicated on the noisy upstream channel.

In accordance with some embodiments, a (optionally non-transitory) computer-readable storage medium is described. The computer-readable storage medium stores one or more programs for noise analysis in a network, the one or more programs configured to be executed by one or more processors of an electronic device, and the one or more programs including instructions for: determining, for a first plurality of devices on the network, upstream SNR (and/or CER) values for a plurality of upstream channels; identifying a noisy upstream channel based on whether channels of the plurality of upstream channels meet a noisy channel criteria; and identifying a plurality of suspect devices based on respective devices of the plurality of devices meeting a set of one or more suspect criteria, wherein the plurality of suspect devices is less than the first plurality of devices, and wherein the set of one or more suspect criteria includes a channel criterion that is met for a respective device when the respective device has communicated on the noisy upstream channel.

In accordance with some embodiments, an electronic device is described. The electronic device includes: one or more processors; and memory storing one or more programs for noise analysis in a network, the one or more programs configured to be executed by the one or more processors, and the one or more programs including instructions for: determining, for a first plurality of devices on the network, upstream SNR (and/or CER) values for a plurality of upstream channels; identifying a noisy upstream channel based on whether channels of the plurality of upstream channels meet a noisy channel criteria; and identifying a plurality of suspect devices based on respective devices of the plurality of devices meeting a set of one or more suspect criteria, wherein the plurality of suspect devices is less than the first plurality of devices, and wherein the set of one or more suspect criteria includes a channel criterion that is met for a respective device when the respective device has communicated on the noisy upstream channel.

In accordance with some embodiments, a method for noise localization in a network is described. The method includes: identifying one or more channels that are affected by upstream noise on the network; identifying a plurality of devices on the network that are attached to the one or more channels that are affected by upstream noise; displaying a map; subsequent to identifying the one or more channels that are affected by upstream noise: determining, for at least two devices of the plurality of devices that are attached to the one or more channels, respective noise scores; and subsequent to determining the respective noise scores, displaying, on the map, visual indications of the at least two devices of the plurality of devices that are attached to the one or more channels, wherein: in accordance with a determination that the determined noise score of a respective device is within a first noise score range, the visual indication of the respective device has a first characteristic without having a second characteristic; and in accordance with a determination that the determined noise score of the respective device is within a second noise score range, the visual indication of the respective device has the second characteristic without having the first characteristic.

In accordance with some embodiments, a (optionally non-transitory) computer-readable storage medium is described. The computer-readable storage medium stores one or more programs for noise localization in a network, the one or more programs configured to be executed by one or more processors of an electronic device with a display, and the one or more programs including instructions for: identifying one or more channels that are affected by upstream noise on the network; identifying a plurality of devices on the network that are attached to the one or more channels that are affected by upstream noise; displaying a map; subsequent to identifying the one or more channels that are affected by upstream noise: determining, for at least two devices of the plurality of devices that are attached to the one or more channels, respective noise scores; and subsequent to determining the respective noise scores, displaying, on the map, visual indications of the at least two devices of the plurality of devices that are attached to the one or more channels, wherein: in accordance with a determination that the determined noise score of a respective device is within a first noise score range, the visual indication of the respective device has a first characteristic without having a second characteristic; and in accordance with a determination that the determined noise score of the respective device is within a second noise score range, the visual indication of the respective device has the second characteristic without having the first characteristic.

In accordance with some embodiments, an electronic device is described. The electronic device includes: a display; one or more processors; and memory storing one or more programs for noise localization in a network, the one or more programs configured to be executed by the one or more processors, and the one or more programs including instructions for: identifying one or more channels that are affected by upstream noise on the network; identifying a plurality of devices on the network that are attached to the one or more channels that are affected by upstream noise; displaying a map; subsequent to identifying the one or more channels that are affected by upstream noise: determining, for at least two devices of the plurality of devices that are attached to the one or more channels, respective noise scores; and subsequent to determining the respective noise scores, displaying, on the map, visual indications of the at least two devices of the plurality of devices that are attached to the one or more channels, wherein: in accordance with a determination that the determined noise score of a respective device is within a first noise score range, the visual indication of the respective device has a first characteristic without having a second characteristic; and in accordance with a determination that the determined noise score of the respective device is within a second noise score range, the visual indication of the respective device has the second characteristic without having the first characteristic.

In accordance with some embodiments, a method for analyzing a network is described. The method includes: concurrently displaying: a graphical representation of a network quality metric graphed against a first duration of time for a signal; and a map of an area, wherein the map includes concurrent display of: one or more geographical elements of the area that are not network devices, and a plurality of network devices; while displaying the graphical representation of the network quality metric for the signal, receiving input selecting a first time that is within the first duration of time; and in response to receiving the input selecting the first time, updating the map of the area to change a visual characteristic of at least some of the displayed plurality of network devices based on a respective noise score for the corresponding network devices at the selected first time.

In accordance with some embodiments, a device for analyzing a network is described. The device comprises one or more process; and memory storing one or more programs configured to be executed by the one or more processors, the one or more programs including instructions for: concurrently displaying: a graphical representation of a network quality metric graphed against a first duration of time for a signal; and a map of an area, wherein the map includes concurrent display of one or more geographical elements of the area that are not network devices, and a plurality of network devices; while displaying the graphical representation of the network quality metric for the signal, receiving input selecting a first time that is within the first duration of time; and in response to receiving the input selecting the first time, updating the map of the area to change a visual characteristic of at least some of the displayed plurality of network devices based on a respective noise score for the corresponding network devices at the selected first time.

In accordance with some embodiments, a computer-readable storage medium for analyzing a network is described. The computer-readable storage medium includes one or more programs configured to be executed by one or more processors, the one or more programs including instructions for: concurrently displaying: a graphical representation of a network quality metric graphed against a first duration of time for a signal; and a map of an area, wherein the map includes concurrent display of: one or more geographical elements of the area that are not network devices, and a plurality of network devices; while displaying the graphical representation of the network quality metric for the signal, receiving input selecting a first time that is within the first duration of time; and in response to receiving the input selecting the first time, updating the map of the area to change a visual characteristic of at least some of the displayed plurality of network devices based on a respective noise score for the corresponding network devices at the selected first time.

In accordance with some embodiments, a method for analyzing a network is described. The method includes: concurrently displaying: a graphical representation of a network quality metric graphed against a first duration of time for a signal; and a map of an area, wherein the map includes concurrent display of: one or more geographical elements of the area that are not network devices, and a plurality of network devices; while displaying the graphical representation of the network quality metric for the signals, receiving first input selecting a first time that is within the first duration of time; and in response to receiving the first input, displaying a first visual indicator corresponding to the first time in the graphical representation of the network quality metric; while displaying the graphical representation of the network quality metric for the signals, receiving second input selecting a second time, different from the first time, that is within the first duration of time; and in response to receiving the second input, displaying a second visual indicator corresponding to the second time in the graphical representation of the network quality metric; subsequent to receiving the first input and the second input: determining a change in a noise score for each of the plurality of network devices between the first time and the second time; determining whether the respective change in the noise score for each respective network device of the plurality of network devices meets a noise score change criteria; displaying, based on the determinations of whether respective changes in the noise scores meet the noise score change criteria, the map of the area such that: respective network devices of the plurality of network devices that meet the noise score change criteria are displayed using a first visual appearance.

In accordance with some embodiments, a device for analyzing a network is described. The device includes one or more processors; and memory storing one or more programs configured to be executed by the one or more processors, the one or more programs including instructions for: concurrently displaying: a graphical representation of a network quality metric graphed against a first duration of time for a signal; and a map of an area, wherein the map includes concurrent display of: one or more geographical elements of the area that are not network devices, and a plurality of network devices; while displaying the graphical representation of the network quality metric for the signals, receiving first input selecting a first time that is within the first duration of time; and in response to receiving the first input, displaying a first visual indicator corresponding to the first time in the graphical representation of the network quality metric; while displaying the graphical representation of the network quality metric for the signals, receiving second input selecting a second time, different from the first time, that is within the first duration of time; and in response to receiving the second input, displaying a second visual indicator corresponding to the second time in the graphical representation of the network quality metric; subsequent to receiving the first input and the second input: determining a change in a noise score for each of the plurality of network devices between the first time and the second time; determining whether the respective change in the noise score for each respective network device of the plurality of network devices meets a noise score change criteria; displaying, based on the determinations of whether respective changes in the noise scores meet the noise score change criteria, the map of the area such that: respective network devices of the plurality of network devices that meet the noise score change criteria are displayed using a first visual appearance.

In accordance with some embodiments, a computer-readable storage medium for analyzing a network is described. The computer-readable storage medium store one or more programs configured to be executed by one or more processors, the one or more programs including instructions for: concurrently displaying: a graphical representation of a network quality metric graphed against a first duration of time for a signal; and a map of an area, wherein the map includes concurrent display of: one or more geographical elements of the area that are not network devices, and a plurality of network devices; while displaying the graphical representation of the network quality metric for the signals, receiving first input selecting a first time that is within the first duration of time; and in response to receiving the first input, displaying a first visual indicator corresponding to the first time in the graphical representation of the network quality metric; while displaying the graphical representation of the network quality metric for the signals, receiving second input selecting a second time, different from the first time, that is within the first duration of time; and in response to receiving the second input, displaying a second visual indicator corresponding to the second time in the graphical representation of the network quality metric; subsequent to receiving the first input and the second input: determining a change in a noise score for each of the plurality of network devices between the first time and the second time; determining whether the respective change in the noise score for each respective network device of the plurality of network devices meets a noise score change criteria; displaying, based on the determinations of whether respective changes in the noise scores meet the noise score change criteria, the map of the area such that: respective network devices of the plurality of network devices that meet the noise score change criteria are displayed using a first visual appearance.

In accordance with some embodiments, a method for analyzing a network is described. The method comprises: determining a first time at which a first type of network impairment is negatively affecting the network; determining a second time at which the first type of network impairment is not negatively affecting the network or is negatively affecting the network less than at the first time; calculating, for each of a plurality of network devices of the network: a first noise score for the first time using a first calculation; a second noise score for the first time using a second calculation different from the first calculation; a third noise score for the second time using the first calculation; and a fourth noise score for the second time using the second calculation; determining, for each of the plurality of network devices: a first difference score by calculating a difference between the first noise score and the third noise score for the respective network device; and a second difference score by calculating a difference between the second noise score and the fourth noise score for the respective network device; identifying the first calculation as an indicator of the first type of network impairment when a subset of the plurality of network devices have first difference scores that exceed a threshold difference; and identifying the second calculation as an indicator of the first type of network impairment when a subset of the plurality of network devices have second difference scores that exceed the threshold difference.

In accordance with some embodiments, a device for analyzing a network is described. The device includes one or more processors; and memory storing one or more programs configured to be executed by the one or more processors, the one or more programs including instructions for: determining a first time at which a first type of network impairment is negatively affecting the network; determining a second time at which the first type of network impairment is not negatively affecting the network or is negatively affecting the network less than at the first time; calculating, for each of a plurality of network devices of the network: a first noise score for the first time using a first calculation; a second noise score for the first time using a second calculation different from the first calculation; a third noise score for the second time using the first calculation; and a fourth noise score for the second time using the second calculation; determining, for each of the plurality of network devices: a first difference score by calculating a difference between the first noise score and the third noise score for the respective network device; and a second difference score by calculating a difference between the second noise score and the fourth noise score for the respective network device; identifying the first calculation as an indicator of the first type of network impairment when a subset of the plurality of network devices have first difference scores that exceed a threshold difference; and identifying the second calculation as an indicator of the first type of network impairment when a subset of the plurality of network devices have second difference scores that exceed the threshold difference.

In accordance with some embodiments, a computer-readable storage medium for analyzing a network is described. The computer-readable storage medium store one or more programs configured to be executed by one or more processors, the one or more programs including instructions for: determining a first time at which a first type of network impairment is negatively affecting the network; determining a second time at which the first type of network impairment is not negatively affecting the network or is negatively affecting the network less than at the first time; calculating, for each of a plurality of network devices of the network: a first noise score for the first time using a first calculation; a second noise score for the first time using a second calculation different from the first calculation; a third noise score for the second time using the first calculation; and a fourth noise score for the second time using the second calculation; determining, for each of the plurality of network devices: a first difference score by calculating a difference between the first noise score and the third noise score for the respective network device; and a second difference score by calculating a difference between the second noise score and the fourth noise score for the respective network device; identifying the first calculation as an indicator of the first type of network impairment when a subset of the plurality of network devices have first difference scores that exceed a threshold difference; and identifying the second calculation as an indicator of the first type of network impairment when a subset of the plurality of network devices have second difference scores that exceed the threshold difference.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 2A-2C illustrates an exemplary flow diagram, in accordance with some embodiments.

FIG. 7 illustrates an exemplary flow diagram, in accordance with some embodiments.

FIGS. 9A-9B illustrates an exemplary flow diagram, in accordance with some embodiments.

DESCRIPTION OF EMBODIMENTS

Figure 1:
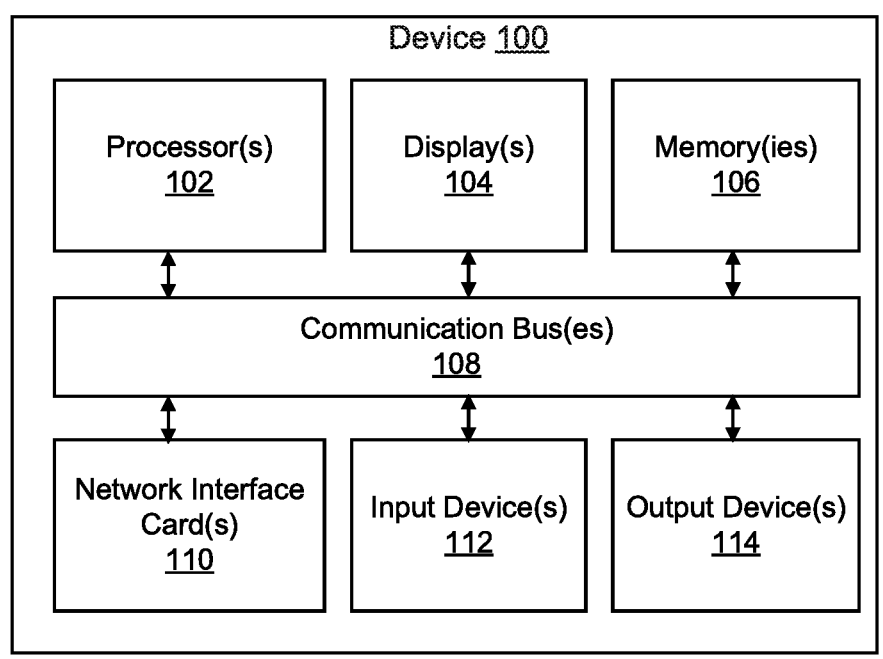
FIG. 1 illustrates an exemplary electronic device, in accordance with some embodiments.

The following description sets forth exemplary methods, parameters, and the like. It should be recognized, however, that such description is not intended as a limitation on the scope of the present disclosure, but is instead provided as a description of exemplary embodiments.

One significant impairment in a cable network is upstream noise. Upstream noise can enter from one or more points of impairments into the network (e.g., ingress) or be generated from a network device (or at an interconnection of a network device) such as a cable modem within the network. Upstream noise on one upstream data communication channel travels upward toward the fiber-node or cable modem termination system (CMTS) and impairs the communication of all devices on the same upstream channel. However, it is difficult to detect (or to accurately detect) (1) from where the noise entered into the network and/or (2) which network device generated the noise. In some examples, the location of the source of upstream noise can be found by physically disconnecting different legs of the network or different devices and confirming whether the noise continues to exist or is gone. This process of elimination can be very time consuming, costly, and labor intensive. In additional, this process of elimination can be impractical, such as when the noise source is located at a customer premise or the noise is coming from customer premise equipment (CPE). In some examples, a spectrum analyzer or spectrum analyzer function (e.g., of a cable modem and/or CMTS) can be used to attempt to detect and localize noise. However, such techniques are cumbersome and inefficient. Importantly, spectrum analyzer-based techniques are often inaccurate in detecting and localizing the source of upstream noise.

In networks, such as in a cable network (e.g., a DOCSIS network), a significant amount of data related to the functioning of network devices (e.g., a cable modem (CM) or modem, a cable modem termination system (CMTS)) is collected and, optionally, transmitted across the network. These network parameters include, but are not limited to, upstream and downstream (transmit and received) power levels, upstream and downstream signal to noise ratio (SNR), Codeword Error (CER), and pre-equalization and post equalization parameters. These parameters are used for monitoring the performance of the network as well as performing reactive and proactive network maintenance (PNM). In the presence of upstream noise, some of these parameter values change differently in different network segments relative to the location where noise is entering (or being generated in) the network (noise location), and therefore, can be used to determine the location of the noise.

The values of many of these network parameters show different levels of inconsistency in time and for different channel frequencies, in the presence of noise and for different types of noise and in different network segments. Different network impairments result in different inconsistencies in the network parameters. For example, the inconsistencies differ when other types of (or additional) impairments are present in the network. One particular challenge is that multiple (or all) modems affected by the same noise on upstream can show the same kind of inconsistencies, thereby making it more difficult to localize the source of the noise. Using advanced statistical analysis and/or artificial intelligence techniques, it is possible to analyze the inconsistencies (in time, in frequency, for noise type and for network segment, etc.) of the values of network parameters, their combination and/or correlation identify the source of noise and/or to locate where (or near to what network node) noise is entering the network. In some examples, this process produces one or more noise scores showing which modem is likely to be the source of noise. In some examples, this process produces one or more noise scores showing where (e.g., at which network node, near which network node) noise is likely entering the network. In some examples, this process produces one or more noise scores showing what type of noise is likely present in the network. Some examples of the types of noise that can be identified include:

1. Noise that entered the network through an impairment in the network, such as a damaged cable or a damaged amplified connector (ingress);
2. Noise that was generated/emitted by a CPE (e.g., cable modem or a set top box);
3. Noise that was generated by a CPE that was cause by an impairment in the network. For example, a loose connected near/at the CPE may impair the grounding of the shield and cause the CPE to emit noise;
4. Noise generated by CPEs (Docsis modems or Set Top Boxes) due to higher than allowed upstream transmit power;
5. Noise generated in the network by an impairment, such as Common Path Distortion (CPD) from for example, a corroded and/or loose connector; and
6. Noise generated by amplifiers due to higher than allowed upstream amplification gain.

The process monitors parameters of the network to identify the type of noise and/or to localize noise. Noise can be localized by monitoring the parameters over time and/or over multiple channel frequencies. The values of the parameters also reflect the type of noise and/or the proximity to the noise source. Noise localization is performed using one or more of the parameters to generate noise scores for respective network devices. In some examples, one or more first order derivatives (rate of change; in time) of the parameters are also used to generate the noise score. In some examples, one or more second order derivatives (how the rate of change is changing, in time) of the parameters are used to generate the noise score. The parameters optionally used to generate noise scores can be categorized into one of several categories, including (1) parameters obtained directly from the modems and/or CMTSes, (2) parameters calculated using category 1 parameter values (e.g., parameters obtained directly from modems/CMTSes), (3) parameters obtained by analyzing variations of the category 1 and 2 parameters over time (e.g., over a single channel), (4) parameters obtained by analyzing variations of parameters of category 1 and 2 over multiple channel frequencies (e.g., at a single point in time), (5) parameters obtained from combining the parameters in categories 1, 2, 3 and 4, and (6) calculated parameters that show dependencies and/or correlation between the parameters in any two or more of categories 1, 2, 3, 4 and 5.

Exemplary category 1 parameters obtained directly from modems and/or CMTSes optionally include: CM Upstream signal to noise ratio (SNR), CM Transmit power level, CM Downstream SNR, CM Downstream Power level, CM Codeword Error Rate, CM Pre-Equalization coefficients, CMTS interface signal to noise ratio, CMTS receive power level, CMTS Codeword Error Rate, and CMTS Post-Equalization coefficients.

Exemplary category 2 parameters calculated using category 1 parameter values optionally include: CM Micro Reflection Level, CM Frequency Response, CM Group Delay, CMTS Micro Reflection, CMTS Frequency Response, CMTS Group Delay, NMTER—Non Main Tap Energy to Total Tap Energy, CMTS NMTER—CMTS Non Main Tap Energy to Total Tap Energy, MTR—Main Tap Ratio, TTE—Total Tap Energy, Downstream Noise Spectral Density, Upstream Noise Spectral Density.

Exemplary category 3 parameters obtained by analyzing variations of the category 1 and 2 parameters over time optionally include: standard deviation of category 1 and 2 parameters, coefficient of variation of category 1 and 2 parameters, first order derivative (rate of change in time) of 1 and 2 parameters, and second order derivative (how the rate of change is changing in time) of 1 and 2 parameters.

Exemplary category 4 parameters obtained by analyzing variations of the category 1 and 2 parameters over channel frequencies optionally include: standard deviation of category 1 and 2 parameters, coefficient of variation of category 1 and 2 parameters, first order derivative (rate of change in time) of 1 and 2 parameters, and second order derivative (how the rate of change is changing in time) of 1 and 2 parameters.

Exemplary category 5 parameters obtained by analyzing combination of the category 1, 2 and 3 parameters over time optionally include: NMTER to SNR ratio, Transmit power level to SNR ratio, etc.

Exemplary category 6 parameters obtained by analyzing correlation of the category 1, 2 and 3 parameters over time optionally include: Transmit power level variation and NMTER variation correlation in time, Transmit power level variation and MTER variation correlation in time, Transmit power level variation and TTE variation correlation in time, etc.

FIG. 1 illustrates an exemplary electronic device (e.g., a server, a computer), in accordance with some embodiments. In some examples, the techniques described below can be performed at device 100. Device 100 is an electronic device with one or more processors 102, one or more displays 104, one or more memories 106, one or more network interface cards 110, one or more input devices (e.g., keyboard 112), one or more output device 114 (e.g., printer), connected via one or more communication buses 108. Many of elements of device 100 are optional, such as display 104, input devices 112, and output devices 114. Memories 106 can include random access memory, read-only memory, flash memory, and the like. Memory 106 can include a non-transitory computer-readable storage medium. The non-transitory computer-readable storage medium is configured to store one or more programs configured to be executed by the one or more processors 102 of device 100. The one or more programs optionally include instructions for performing the described techniques.

Figure 2A:
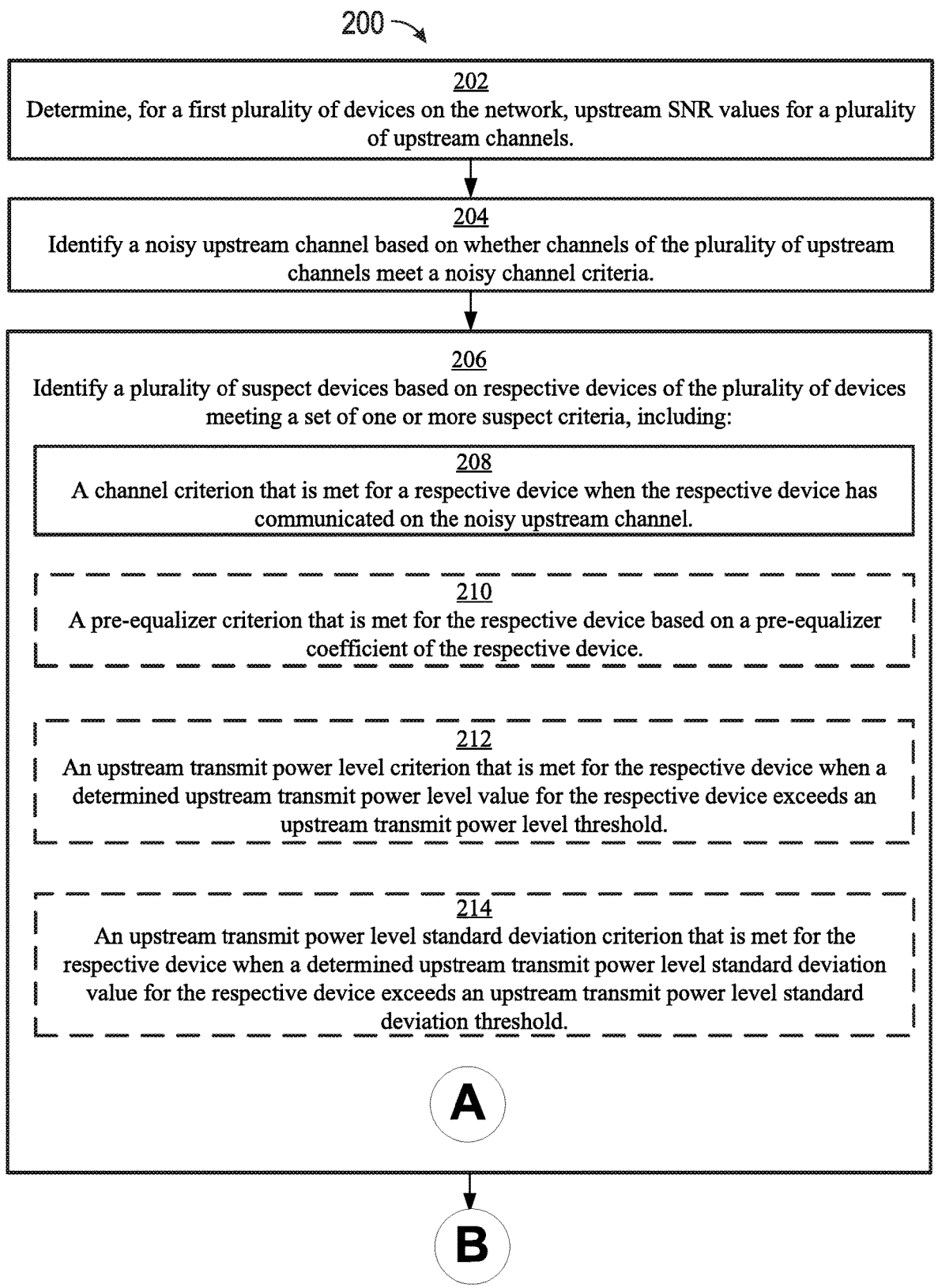
Figure 2C:
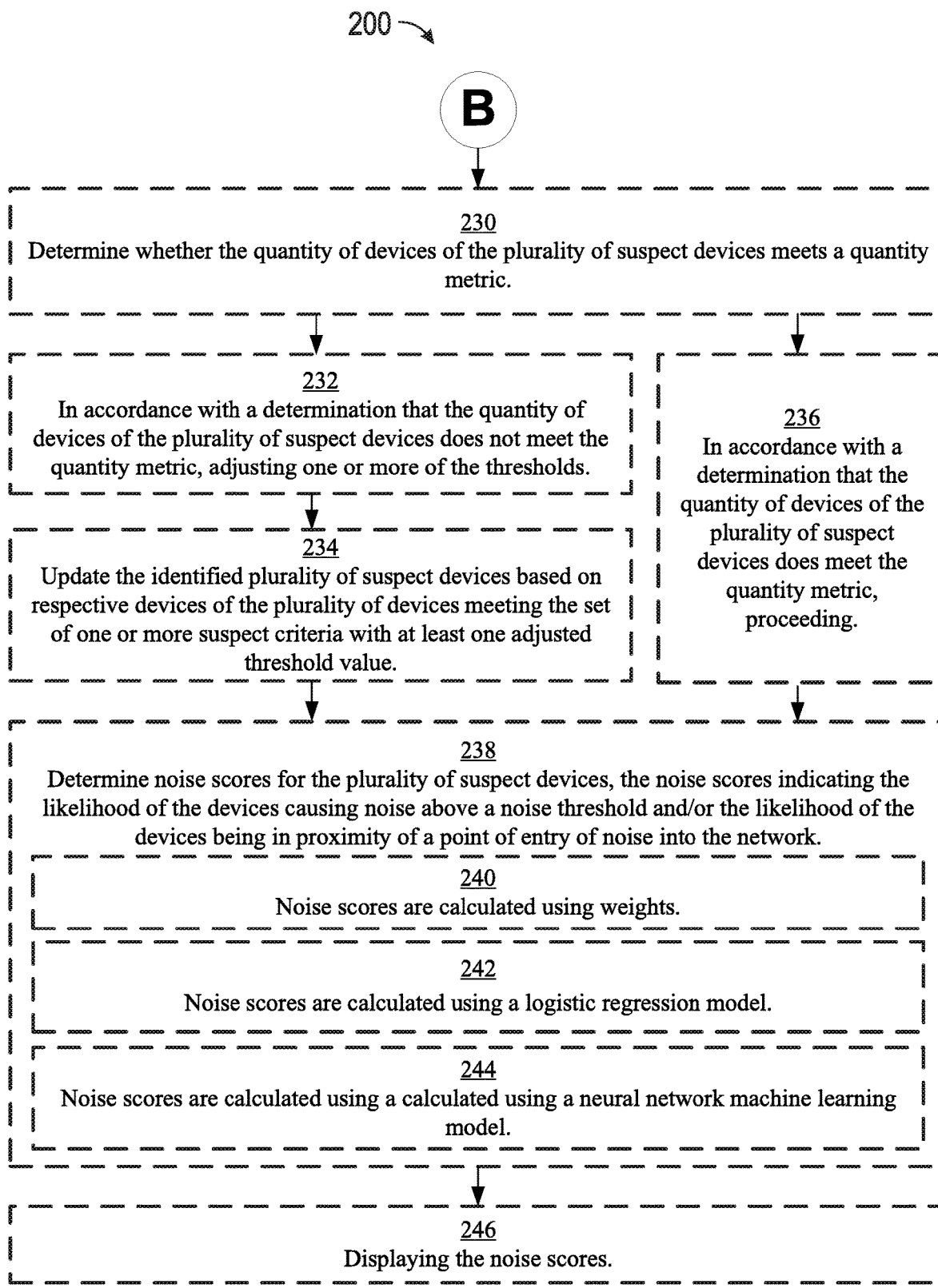

FIGS. 2A-2C illustrate an exemplary flow diagram for noise analysis in a network, in accordance with some embodiments. In some examples, the technique is performed at an electronic device (e.g., device 100), such as on an analysis server or computer optionally connected to the network. In some examples, the electronic device includes memory storing one or more programs for execution by one or more processors of the electronic device, the one or more programs including instructions for performing the technique.

The technique checks the upstream SNR (and/or CER) for multiple devices on multiple channels to identify a noisy upstream channel. Once a noise upstream channel is identified, the technique identifies corresponding suspect devices communicating on the noisy channel. In some example, the suspect devices are devices on the network that may potentially be introducing excess noise into the network.

At block 202, the analysis server computer) determines (e.g., polls for and receives), for a first plurality of devices (e.g., a plurality of CMs) on the network, upstream SNR values for a plurality of upstream channels (e.g., for a duration of time). In some examples, the analysis server monitors communications on the network and determines (e.g., polls for, receives from one or more CMTSs) SNR values for multiple devices (e.g., each device on the network) for multiple upstream channels (e.g., for each upstream channel of the network, for a predetermined set of upstream channels) on which each device transmits. In some examples, determining the first plurality of devices is independent of downstream SNR values for the devices.

At block 204, the analysis server identifies a noisy upstream channel (or, optionally, a plurality of noisy upstream channels) based on whether channels of the plurality of upstream channels meet a noisy channel criteria (e.g., for the duration of time). In some examples, the noisy channel criteria are met for channels that have an upstream SNR below a threshold. For example, the technique detects (e.g., measures, determines) SNR values for multiple devices on a particular upstream channel. In some examples, the SNR for the particular upstream channel is an average SNR for that channel. The technique determines whether the SNR for the particular channel is below the threshold. When the SNR for the particular channel is below the threshold, the particular channel is identified as being a noisy upstream channel. When the SNR for the particular channel is not below the threshold, the particular channel is not identified as being a noisy upstream channel. In some examples, the threshold is 30 dB. Thus, upstream channels with SNR below 30 dB are identified as noisy upstream channels. In some examples, the noisy upstream channel is identified based on having the lowest SNR of the plurality of upstream channels.

At block 206, the analysis server identifies a plurality of suspect devices (or a single suspect device) based on respective devices of the plurality of devices meeting (e.g., for the duration of time) a set of one or more suspect criteria (e.g., if a particular device of the plurality of devices meets the set of suspect criteria, that particular device is identified as being in the suspect plurality of devices). The plurality of suspect devices is (a subset) less than the first plurality of devices.

At block 208, the set of one or more suspect criteria includes a channel criterion that is met for a respective device when the respective device has communicated (e.g., during the duration of time) on the noisy upstream channel (e.g., during the time used to determine the upstream SNR for the noise upstream channel). In some examples, the analysis server monitors communications on the network and detects that certain devices (e.g., CM) transmit on the noisy upstream channel. In some examples, the analysis server compiles a list of devices communicating on the noisy upstream channel during a time period that the noisy channel criteria was met. For example, the plurality of suspect devices are identified as potentially (or likely) containing the source of the noise or being affected by noise present in the network, such as ingress noise or noise generated by other modems.

At block 210, the technique optionally reduces the number of suspect devices based on the pre-equalizer coefficients of devices. For example, the set of one or more suspect criteria optionally includes a pre-equalizer criterion that is met for the respective device based on a pre-equalizer coefficient of the respective device (e.g., for the noisy channel). In some examples where the set of one or more suspect criteria includes the pre-equalizer criterion, the technique analyzes pre-equalizer coefficients of the second plurality of devices on the network to determine whether the devices meet the pre-equalizer criterion. If a device meets the pre-equalizer criterion and the other criterions of the set of one or more suspect criteria, the device is identified as a suspect device. If the device does not meet the pre-equalizer criterion, the device is not identified as a suspect device. For example, some devices use pre-equalization to modify carriers (e.g., pre-distort carriers) to (partially or fully) offset or cancel out distortions caused by reflections (e.g., microreflections) in the network. The pre-equalizer coefficient of the device is an indication of whether and to what degree the device is compensating for particular problems in the network. In some examples, pre-equalizer criterion that is met for the respective device when the pre-equalizer coefficient of the respective device is a non-zero value. In some examples, pre-equalizer criterion that is met for the respective device when the pre-equalizer coefficient of the respective device is with a predetermined range of values. In some examples, pre-equalizer criterion that is met for the respective device when the pre-equalizer coefficient of the respective device exceeds (or alternatively, does not exceed) a determined coefficient value. In some examples, pre-equalizer criterion is variable and the technique adjusts the pre-equalizer criterion to reduce or increase the number of identified suspect devices. For example, if no suspect devices are initially identified using an initial pre-equalizer criterion, the technique automatically adjusts the criterion to increase the number of suspect devices.

At block 212, the technique optionally reduces the number of suspect devices based on the respective device's upstream transmit power levels. In some examples, the set of one or more suspect criteria optionally includes an upstream transmit power level criterion that is met for the respective device when a determined (e.g., measured, received) upstream transmit power level value for the respective device (e.g., for the noisy channel) exceeds an (e.g., non-zero) upstream transmit power level threshold. In some examples, the upstream transmit power level is (or is based on) the power with which the respective device is transmitting on a suspect channel (e.g., over the duration of time).

At block 214, the technique optionally reduces the number of suspect devices based on the respective device's upstream transmit power level standard deviation. In some examples, the set of one or more suspect criteria optionally includes an upstream transmit power level standard deviation criterion that is met for the respective device when a determined (e.g., measured, received) upstream transmit power level standard deviation value for the respective device (e.g., for the noisy channel) exceeds an (e.g., non-zero) upstream transmit power level standard deviation threshold. In some examples, the upstream transmit power level standard deviation is (or is based on) the standard deviation of the power with which the respective device is transmitting on a suspect channel (e.g., over the duration of time). Generally, the higher the standard deviation of the upstream transmit power level, the more likely the device is affect by noise.

At block 216, the technique optionally reduces the number of suspect devices based on the respective device's NMTER. In some examples, the set of one or more suspect criteria optionally includes an NMTER (non-main tap energy to total tap energy ratio) criterion that is met for the respective device when a determined (e.g., measured, received) NMTER value for the respective device (e.g., for the noisy channel) exceeds an (e.g., non-zero) NMTER threshold. In some examples, the non-main tap energy (or its standard deviation) is used as a criteria in the set of one or more suspect criteria.

At block 218, the technique optionally reduces the number of suspect devices based on the respective device's NMTER standard deviation. In some examples, the set of one or more suspect criteria optionally includes an NMTER (non-main tap energy to total tap energy ratio) standard deviation criterion that is met for the respective device when a determined (e.g., measured, received) NMTER standard deviation value for the respective device (e.g., for the noisy channel) exceeds an (e.g., non-zero) NMTER standard deviation threshold. Generally, the higher the standard deviation of the NMTER, the more likely the device is affect by noise.

At block 220, the technique optionally reduces the number of suspect devices based on the respective device's power level-to-NMTER correlation. In some examples, the set of one or more suspect criteria optionally includes a (upstream) power level-to-NMTER (non-main tap energy to total tap energy ratio) correlation criterion that is met for the respective device when a determined (e.g., measured, received) power level-to-NMTER correlation value for the respective device exceeds a (e.g., non-zero) power level-to-NMTER correlation threshold. For example, the technique determines the correlation between the upstream transmit power level of the respective device and the NMTER of the respective device. In some examples, the correlation is measured as a number of points (e.g., in percent) where NMTER metric value changes according to power level change, such that the percent value indicates the probability (or likelihood) that the device raises the power level to overcome the noise floor. Generally, the higher the correlation, the more likely the respective device is affected by the noise. In some examples, this percent value is used as a noise score for the respective device.

At block 222, the technique optionally reduces the number of suspect devices based on the respective device's NMITE. In some examples, the set of one or more suspect criteria optionally includes an NMITE (non-main tap individual tap energy) criterion that is met for the respective device when a determined (e.g., measured, received) NMITE value for the respective device (e.g., for the noisy channel) exceeds (or does not exceed) an (e.g., non-zero) NMITE threshold.

At block 224, the technique optionally reduces the number of suspect devices based on the respective device's SNR. In some examples, the set of one or more suspect criteria, includes an (upstream) SNR (signal-to-noise ratio) criterion that is met for the respective device when a determined (e.g., measured, received) SNR value for the respective device (e.g., for the noisy channel) does not exceed an (e.g., non-zero) SNR threshold. Generally, the lower the SNR, the more likely the device is affect by the noise. In some examples, this analysis is performed for each of the plurality of upstream channels.

At block 224, the technique optionally reduces the number of suspect devices based on the respective device's SNR standard deviation. In some examples, the set of one or more suspect criteria optionally includes an (upstream) SNR (signal-to-noise ratio) standard deviation criterion that is met for the respective device when a determined (e.g., measured, received, calculated) SNR standard deviation value for the respective device (e.g., for the noisy channel) exceeds an (e.g., non-zero) SNR standard deviation threshold. Generally, the higher the SNR standard deviation value, the more likely the device is affect by the noise. In some examples, this analysis is performed for each of the plurality of upstream channels.

At block 224, the technique optionally reduces the number of suspect devices based on the respective device's CER. In some examples, the set of one or more suspect criteria optionally includes a (upstream) CER (codeword error rate) criterion that is met for the respective device when a determined (e.g., measured, received) CER value for the respective device (e.g., for the noisy channel) exceeds a (e.g., non-zero) CER threshold. Generally, the higher the CER value, the more likely the device is affect by the noise. In some examples, the initial CER threshold is $1*10^{-9}$.

In some embodiments, the technique optionally reduces the number of suspect devices based on one or more parameters selected from one or more of the above-described categories: (1) parameters obtained directly from the modems and/or CMTSes, (2) parameters calculated using category 1 parameter values (e.g., parameters obtained directly from modems/CMTSes), (3) parameters obtained by analyzing variations of the category 1 and 2 parameters over time (e.g., over a single channel), (4) parameters obtained by analyzing variations of parameters of category 1 and 2 over multiple channel frequencies (e.g., at a single point in time), (5) parameters obtained from combining the parameters in categories 1, 2, 3 and 4, and (6) calculated parameters that show dependencies and/or correlation between the parameters in any two or more of categories 1, 2, 3, 4 and 5.

At block 230, the technique optionally reduces (or increases) the number of suspect devices by changing one or more thresholds. In some examples, the analysis server determines (after initially determining the plurality of suspect devices) whether the quantity of devices of the plurality of suspect devices meets a quantity metric (e.g., not enough suspect devices identified, too many suspect devices identified).

At block 232, in accordance with a determination that the quantity of devices of the plurality of suspect devices does not meet the quantity metric, the analysis server adjusts (e.g., based on the quantity of devices of the plurality of suspect devices) one or more of: the upstream transmit power level threshold, the upstream transmit power level standard deviation threshold, the NMTER threshold, the NMTER standard deviation threshold, the NMITE threshold, SNR threshold, SNR standard deviation threshold, and CER threshold.

At block 234, subsequent to the adjusting at block 232, the analysis server updates the identified plurality of suspect devices (or a single suspect device) based on respective devices of the plurality of devices meeting (e.g., for the duration of time) the set of one or more suspect criteria with at least one adjusted threshold value (or a plurality of adjusted threshold values). In some examples, in accordance with a determination that the quantity of devices of the plurality of suspect devices does meet the quantity metric, the technique forgoes adjusting (any of) the thresholds and forgoes updating identified plurality of suspect devices.

At block 238, the technique optionally determines (e.g., by calculating) noise scores for (at least some of, each of) the plurality of suspect devices, the noise scores indicating the likelihood of the devices causing noise above a noise threshold and/or the likelihood of the devices being in proximity of a point of entry of noise into the network.

At block 240, the noise scores are optionally calculated using weights and the number of conditions (e.g., of blocks 210-238) that are met. In some examples, the analysis server determining (e.g., by calculating) noise scores for (at least some of, each of) the plurality of suspect devices includes assigning weights to a plurality of network parameters for the plurality of suspect devices, and calculating weight-adjusted noise scores for (at least some of, each of) the plurality of suspect devices, the weight-adjusted noise scores indicating the likelihood of the devices causing noise above a noise threshold and/or the likelihood of the devices being in proximity of a point of entry of noise into the network (and, optionally, the type of noise). In some examples, the weight of a respective network parameter is the same for all devices in the plurality of suspect devices even when the plurality of suspect devices includes a various brands, types, capabilities, etc. In some examples, the weight of a respective network parameter varies for various devices in the plurality of suspect devices based on one or more of: a brand of the device, a model of the device, a hardware or software version of the device, a type of the device, and capabilities of the device. For example, the weighting of the NMTER standard deviation may be set to a weighting (e.g., 2.5) that is different from the weighting of the NMITE (e.g., 12), that is different from the weighting of the upstream transmit power level (e.g., 20).

In some examples, rather than (or in addition to) reducing the devices identified as suspect devices by including additional criteria into the set of one or more suspect criteria, noise scores are calculated for the devices identified as having communicated (e.g., during the duration of time) on the noisy upstream channel. The noise scores are calculated based on whether they meet one or more of the upstream transmit power level threshold, the NMTER threshold, the NMTER standard deviation threshold, the NMITE threshold, SNR threshold, SNR standard deviation threshold, and CER threshold. Devices that meet more of the following criterions are assigned higher noise scores: pre-equalizer criterion, upstream transmit power level criterion, upstream transmit power level standard deviation criterion, NMTER (non-main tap energy to total tap energy ratio) criterion, NMTER (non-main tap energy to total tap energy ratio) standard deviation criterion, power level-to-NMTER (non-main tap energy to total tap energy ratio) correlation criterion, NMITE (non-main tap individual tap energy) criterion, SNR (signal-to-noise ratio) criterion, SNR (signal-to-noise ratio) standard deviation criterion, CER (codeword error rate) criterion, with certain criterions being assigned weights other than 1 while other criterions are assigned a weight of 1.

At block 242, the noise scores are optionally calculated using a logistic regression model. In some examples, the analysis server determining (e.g., by calculating) noise scores for (at least some of, each of) the plurality of suspect devices includes providing a plurality of network parameters for the plurality of suspect devices to a logistic regression model to calculate the noise scores for the plurality of devices (and, optionally, the type of noise).

At block 244, the noise scores are optionally calculated using a neural network machine learning model. In some examples, the analysis server determining (e.g., by calculating) noise scores for (at least some of, each of) the plurality of suspect devices includes providing a plurality of network parameters for the plurality of suspect devices to a neural network machine learning model to calculate the noise scores for the plurality of devices (and, optionally, the type of noise).

In accordance with some examples, the plurality of network parameters (of the devices) are selected from among one or more of: (a) Codeword Error Rate, (b) Micro Reflection Level, (c) CM Pre-Equalized Frequency Response, (d) CMTS CM Equalized Frequency Response, (e) Main Tap Ratio, (f) Non Main Tap Energy to Total Tap Energy Ratio, (g) Power Level, (h) Power Level to MIR Ratio, (i) Power Level to NMTER Ratio, (j) Power Level to TTE Total Tap Energy Ratio, (k) TTE Total Tap Energy, (l) Non Main Individual Tap Energy, (m) Signal to Noise Ratio, (n) SNR spike level above certain threshold over time, and (o) SNR spike count above certain threshold over time for a period of time.

At block 246, the technique optionally provides e.g., displaying on a display, transmitting to a remote (display) device) the noise scores. In some examples, the technique determines (and provides (e.g., displays)) the noise scores, which correspond to probabilities that each of the suspect devices is the cause of significant noise or is in proximity of the point of entry of noise into the network and provides these relationships (probability<->suspect device relationship) to another device or to the user. For example, the operator or maintainer of the network can take action to further analyze or correct the devices identified with high probability (or the device identified with highest probability). In some examples, the technique determines (and provides (e.g., displays)) noise scores for one or more types of noise (e.g., for each of the suspect devices).

As discussed above, a (optionally non-transitory) computer-readable storage medium optionally stores one or more programs configured to be executed by one or more processors of an electronic device (with an optional display), the one or more programs including instructions for performing the technique described with respect to FIG. 2A-2C.

As discussed above, an electronic device comprises: (an optional display), one or more processors, and memory. The memory stores one or more programs configured to be executed by the one or more processors, the one or more programs including instructions for performing the technique described with respect to FIG. 2A-2C.

Another significant impairment in a cable network is white noise, which typically affects both upstream frequencies and downstream frequencies. In cable networks, noise generated in or entering a cable network from a location on the trunk cable, trunk amplifiers, or other passive elements on the distribution network is typically a white noise that affects both the upstream spectrum and the downstream spectrum. This is particularly true when noise enters from one or more points of impairments into the network. For example, the white noise on the cable network can be due to loose connector(s), damaged passive elements(s) (e.g., cable, taps, directional couplers), and/or defective active elements (e.g., amplifiers, line extenders). However, it can be difficult to determine (or to accurately determine) the location from where the white noise entered into the network, thereby limiting the ability of the provider to correct the impairment. In some examples, the location of the source of white noise can be found by physically disconnecting different legs of the network and confirming whether the noise continues to exist or is gone. This process of elimination can be very time consuming, costly, and labor intensive. In additional this process of elimination can be impractical, such as when the network is located in a geographically remote or difficult to access location.

Typically, the cable network carries the downstream (forward) signals and upstream (return) signals at different frequencies (e.g., frequency bands that do not overlap). Typically, the lower frequencies carry upstream signals and the higher frequencies carry downstream signals. For example, a network may be designed to carry upstream signals from 5 MHz to 45 MHz and to carry downstream signals from 55 MHz to 1 GHz. In some examples, the network may be designed to allocate a larger frequency range for upstream to accommodate the desire for higher upstream bandwidth, such as by allocating from 5 MHz to 88 MHz (or higher) for the upstream signals. White noise has a wide spectrum and typically covers both (or portions of both) upstream frequencies (lower frequencies) and downstream frequencies (higher frequencies).

Network lines in the cable network frequently include amplifiers for both the downstream signals and the upstream signals. One (or more) downstream amplifier(s) amplify the downstream or forward signals (e.g., residing at higher frequencies) and one (or more) upstream amplifier(s) amplify the return or upstream signals (e.g., residing at lower frequencies). Diplex filters are implemented so as to separate the signals on the downstream frequencies from the signals at the upstream frequencies. In particular, two diplex filters (e.g., one at the input of the upstream amplifier, one at the input of the downstream amplifier) are used to separate signals at the downstream higher frequencies from signals at the upstream lower frequencies and direct them to the right amplifiers.

As a result of the diplex filters, the higher frequency noise can travel downstream and affect modems downstream from the location of the noise. However, the higher frequency noise cannot travel upstream (or is significantly attenuated when travelling upstream) and the noise generated in these frequencies do not affect (or have a reduced effect) on modems in the network located upstream (and past a diplex/amplifier) from where the noise is entering the network. Accordingly, only modems with noisy downstream signals are located downstream from the location of the noise. In other words, modems that do not have a noisy downstream are not located downstream from the location of the white noise, though they may be located upstream from the white noise. In contrast, in certain circumstances, modems that are both downstream and upstream from the white noise source may have a noisy upstream.

Taps on the network further reduce the ability for higher frequency noise to travel upstream, thereby limiting the effect of the high frequency noise on modems in the network located upstream (and past the tap) from where the noise is entering the network. A tap has an input, an output, and one or more legs. Cable modems are optionally connected to each of the one or more legs. Taps typically have different levels of attenuation at the input, at the output, and at the legs. For example, transmission between the tap input and the tap leg may incur limited loss. For another example, transmission between the tap input and the tap output also incurs limited loss. However, transmissions from the tap output to the tap leg experience high attenuation; transmissions from the tap output to the tap input also experience high attenuation. Accordingly, modems connected upstream (e.g., at the tap legs) from the source of the white noise will be less affected by the white noise as compared to modems connected downstream (e.g., to tap legs of taps located downstream) from the white noise source.

Because of these characteristics of diplex filters, amplifiers, and taps, modems located upstream from the white noise source are affected differently from modems located downstream from the same white noise source. Using this information, the location on the network) of a noise source can be determined based on the downstream noise of various modems on the network. The downstream noise for modems on the network can be determined by polling Downstream SNR for the respective modems, calculating noise Spectral Density (in downstream frequencies) for respective modems, and/or checking the downstream full band spectrum of the respective modems.

Figure 3:
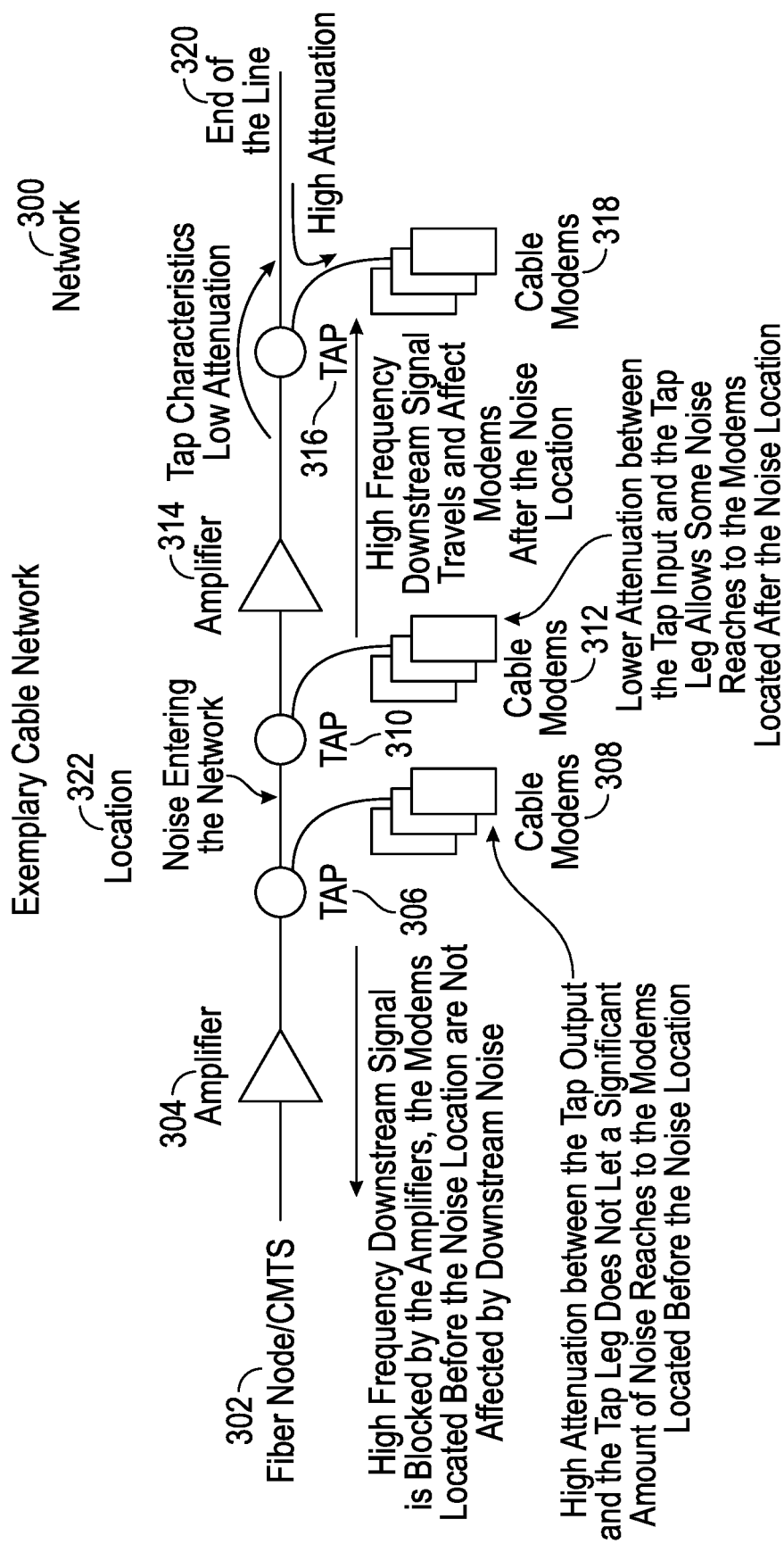
FIG. 3 illustrates a portion of an exemplary cable network map, in accordance with some embodiments.

FIG. 3 illustrates a portion of an exemplary cable network map 300. In some embodiments, the technique displays network 300 on a computer display to provide the viewer with noise localization information (e.g., to identify the area on the map where noise is being introduced into the network). In this example, white noise enters the network at location 322. Because taps 310 and 316 are downstream from location 322, cable modems 312 and 318 connected to the legs of taps 310 and 316, respectively, will experience low downstream SNR as a result of the white noise. For example, amplifier 314 will amplify the downstream signals (high frequency) along with the high-frequency components of the white noise. All devices downstream from the source of the noise (from location 322 to end of the line 320) will experience low SNR.

In contrast, tap 306 will attenuate the high-frequency components of the noise, thereby reducing the amount of noise in the downstream signal that reaches cable modems 308. Similarly, amplifier 304 (with a corresponding diplex filter) will attenuate the high-frequency components of the noise, thereby reducing the amount of noise in the downstream signal that reaches cable modems that are connected between CMTS 302 and amplifier 304.

In this example, the technique would determine that the upstream channel on which modems 308, 312, and 318 are operating has more noise than a threshold noise amount (e.g., has a lower upstream SNR than a threshold upstream SNR). As a result, the technique identifies that modems 308, 312, and 318 are operating on the one or more channels. The technique probes each of the modems in modems 308, each of the modems in modems 312, and each of the modems in modems 318 and receives noise scores, such as downstream signal-to-noise ratios (SNRs), from each of the modems. Because the source of the noise is located at location 322 (which is downstream from the location of tap 306), the technique will receive (in response to the probe) high downstream SNR values from each of the modems 308. In contrast, the technique will receive (in response to the probe) low downstream SNR values from each of the modems 312 and 318 because the high-frequency component of the white noise will propagate to those devices without significant attenuation.

Figure 4:
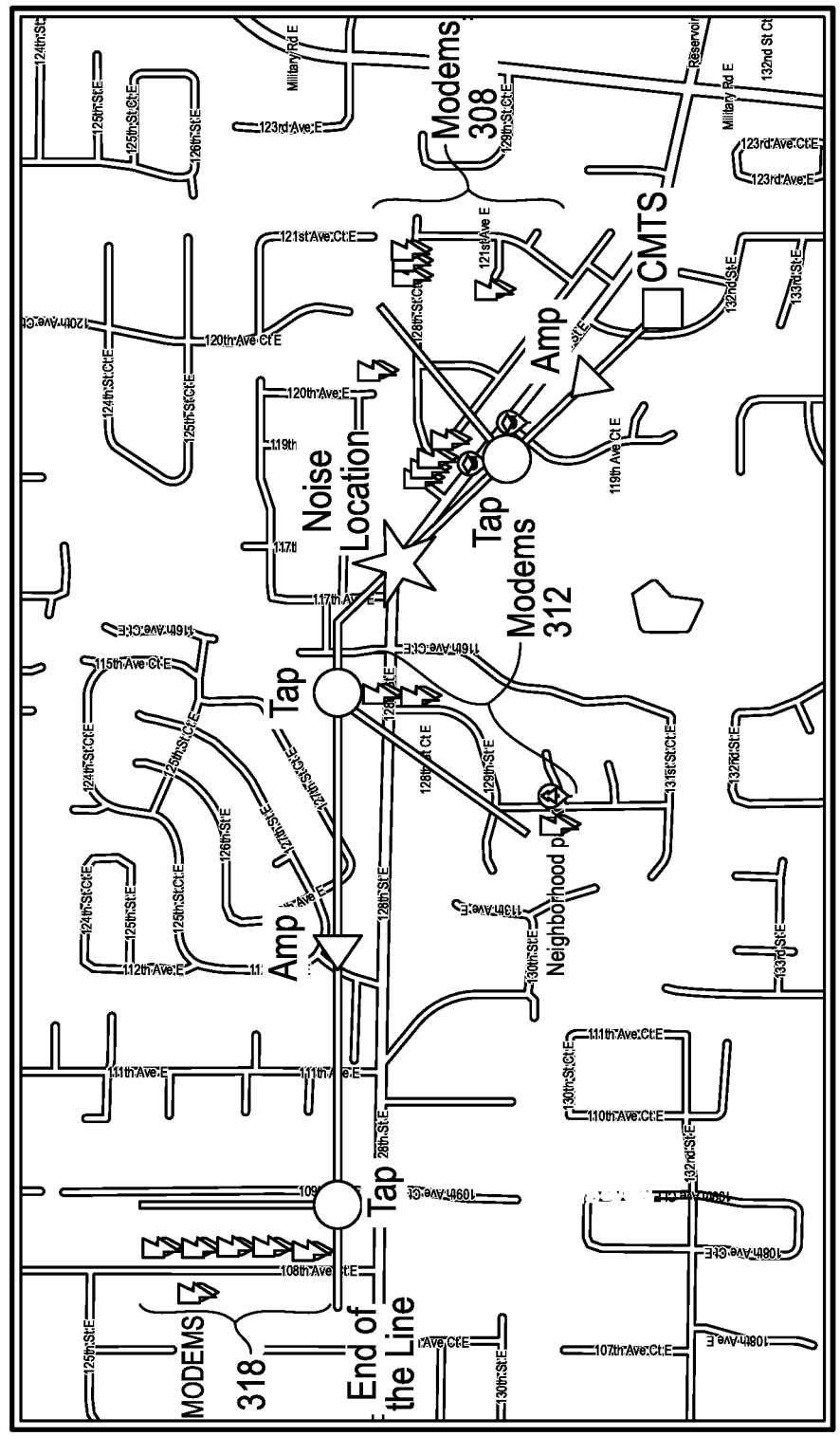
FIG. 4 illustrates an exemplary map, in accordance with some embodiments.

FIG. 4 illustrates an exemplary map 400. In some embodiments, the technique displays map 400 on a computer display as an alternative to display of network map 300. Map 400 can include geographical elements (such as roads and structures) and network elements (such as taps and amps). Map 400 corresponds to the exemplary network described with respect to FIG. 3. The technique displays map 400 by optionally overlaying network components onto the geographical elements, thereby providing the viewer with a more complete understanding of the network and geography. For example, map 400 optionally includes visual representations of one or more types of network elements: cable lines, taps, cable modems, amps, etc. For another example, map 400 optionally includes visual representations of one or more types of geographical elements: roads, buildings, bodies of water, parks, etc. In the example of FIG. 4, the technique displays visual indications 308, 312, and 318 of modems on map 400. The technique differentiates between modems experiencing low downstream SNR and modems not experiencing low downstream SNR by using different shades or colors. In FIG. 4, modems 308 (indicated by lightning bolts) are displayed using one color (e.g., a lighter color) because the technique has received responses from those modems indicating that the modems are not experiencing downstream SNRs below the threshold downstream SNR. In contrast, modems 312 and 318 (indicated by lightning bolts) are displayed using another color (e.g., a darker color) because the technique has received responses from those modems indicating that the modems are experiencing downstream SNRs below the threshold downstream SNR.

In FIG. 4, modems 308 are grouped together as not experiencing downstream SNRs below the threshold downstream SNR and modems 312 and 318 are grouped together as experiencing downstream SNRs below the threshold downstream SNR. As a result, the technique determines that the location of the source of the noise is at a location between tap 310 and 306. The technique displays an indication 322 of the location of the source of the noise on map 400, thereby indicating the area in the cable network that should be investigated. In some examples, indication 322 flashes to draw attention to the impairment. In some examples, indication 322 is a color different from the indications of the modems.

Figure 5:
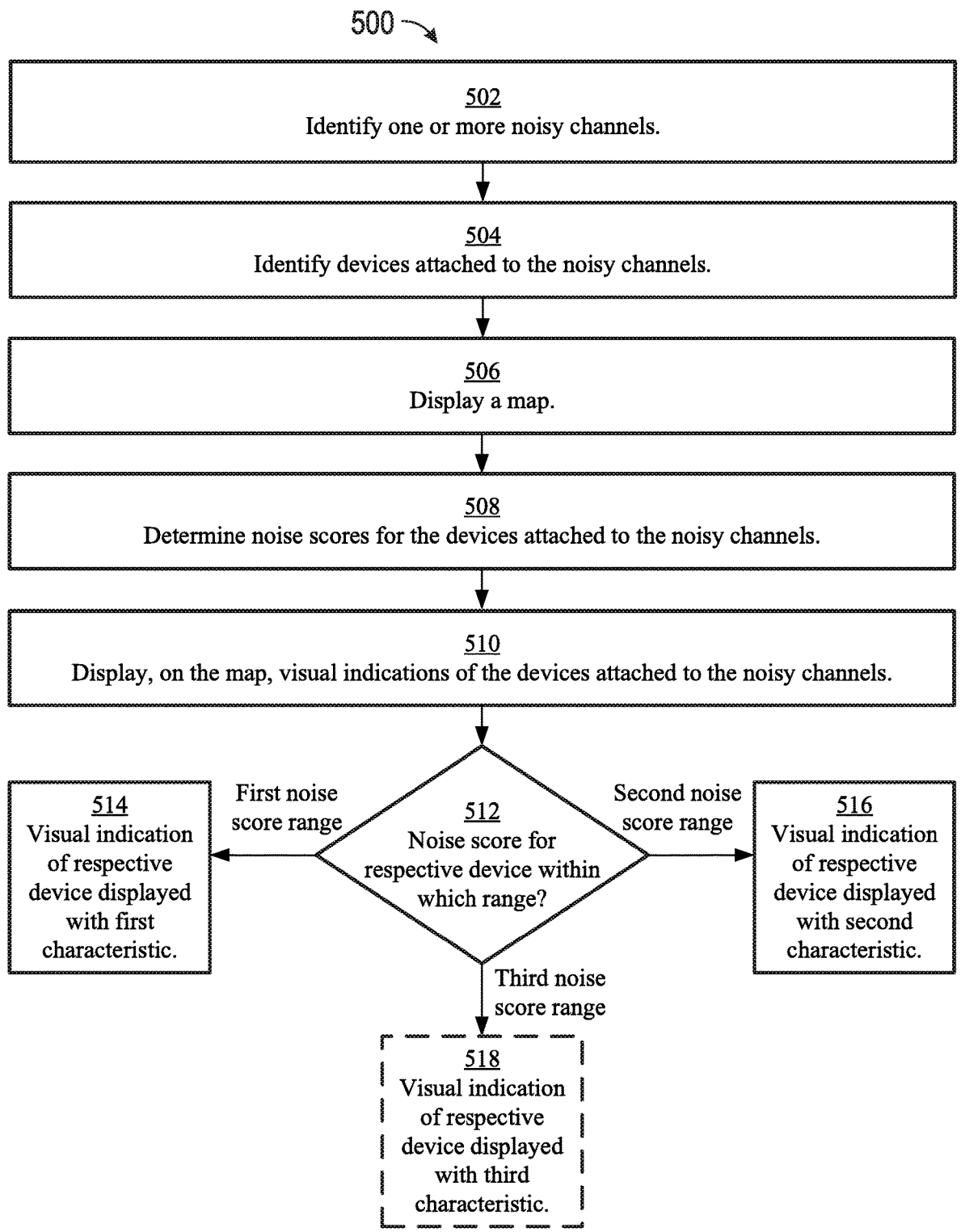
FIG. 5 illustrates an exemplary flow diagram, in accordance with some embodiments.

FIG. 5 illustrates an exemplary flow diagram 500, in accordance with some embodiments. The technique for noise localization in a network is performed at an electronic device (e.g., a computer) with a display, memory for storing computer instructions for the process, and one or more processors for executing the computer instructions.

At block 502, the electronic device identifies one or more (e.g., a plurality of) channels (e.g., upstream channels) that are affected by upstream noise on the network. In some embodiments, the one or more channels are identified as being affected by noise when the one or more channels exhibit noise characteristics that exceed an upstream noise threshold (e.g., lower SNR than a threshold SNR). For example, the CMTS determines that a modulation error rate is higher than a threshold modulation error rate. In some embodiments, the technique continuously or repeatedly monitors the network for upstream channels that are affected by noise. In some embodiments, in response to detecting that one or more channels are affected by upstream noise on the network, a notification is provided (e.g., displayed, transmitted) that identifies the one or more channels.

At block 504, the electronic device identifies (e.g., in response to identifying the one or more channels that are affected by upstream noise) a plurality of devices (e.g., modems, cable modems, setup boxes) on the network that are attached to the one or more channels that are affected by upstream noise (e.g., the one or more channels experiencing upstream noise that exceeds the upstream noise threshold).

At block 506, the electronic device displays a map (e.g., a geographical map that shows roads and structures, a network map that shows the location and connectivity of network elements (such as modems) with respect to each other, combined geographic/network map that displays geographic features and the relative locations of network elements). In some embodiments, the map includes information about the hierarchy of the network elements and, optionally, their relationship the modem mac addresses.

At block 508, subsequent to (e.g., in response to) identifying the one or more channels that are affected by upstream noise and, optionally, subsequent to (e.g., in response to) identifying the plurality of devices that are attached to the one or more channels that are affected by upstream noise), the electronic device determines, for at least two devices of (e.g., for each device of) the plurality of devices that are attached to the one or more channels, respective noise scores (e.g., based on various combinations downstream noise scores and/or upstream noise scores; without determining downstream/upstream noise scores for devices on the network that are not attached to the one or more channels that are affected by the upstream noise).

At block 510, subsequent to determining the respective noise score, the electronic device displays, on the map, visual indications of the at least two devices (e.g., all devices) of the plurality of devices that are attached to the one or more channels (e.g., without displaying visual indications for devices not connected to the one or more channels that are affected by upstream noise). In accordance with a determination, at block 512, that the determined noise score (e.g., upstream SNR, downstream SNR) of a respective device is within a first noise score range (e.g., more than a threshold amount of noise), the visual indication of the respective device is displayed, at block 514, with a first characteristic (e.g., a first appearance, a first color, a first size, a first brightness) without having a second characteristic (e.g., thereby allowing for visual differentiation between devices with determined noise scores within the first noise score range and those not within the first noise score; without having a second appearance, a second color, a second size, a second brightness). In some embodiments, the visual indication of the respective device with the first characteristic also does not have a third characteristic. In accordance with a determination, at block 512, that the determined noise score of the respective device is within a second noise score range (e.g., not more than the threshold amount of noise), the visual indication of the respective device is displayed, at block 516, with the second characteristic and without having the first characteristic (e.g., a second color different from the first color, a second size different from the first size, a second brightness different from the first brightness). In some embodiments, the visual indication of the respective device with the second characteristic also does not have the third characteristic. In some embodiments, the ranges of the first noise score range, the second noise score range, and the third noise score range do not overlap. Importantly, the visual indications do not reflect whether a device on the network is noisy or not (e.g., do not reflect whether the device is generating the noise).

In some embodiments, determining respective noise scores includes determining respective downstream noise scores (e.g., downstream SNR, downstream modulation error rate) for the respective devices.

In some embodiments, determining respective noise scores includes determining respective upstream noise scores (e.g., upstream SNR, upstream modulation error rate) for the respective devices. In some embodiments, the technique determines both upstream and downstream noise scores for the plurality of devices and groups the devices using both metrics.

In some embodiments, determining respective noise scores includes accessing (e.g., polling for) SNR values (e.g., modulation error rates) for the respective devices. In some embodiments, the downstream noise score is the downstream SNR for the respective device.

In some embodiments, determining respective noise scores includes using (e.g., calculating) a Noise Spectral Density (e.g., for downstream frequencies, for upstream frequencies) for the respective devices. In some embodiments, the downstream noise score is the (downstream) Noise Spectral Density for the respective device.

In some embodiments, determining respective noise scores includes using (e.g., determining) a full band spectrum (e.g., in downstream frequencies, in upstream frequencies for the respective devices. In some embodiments, the downstream noise score is the downstream full band spectrum for the respective device.

In some embodiments, the electronic device identifies a first area (e.g., a geographical area, a portion of the network, a network segment, a network element) as including a first noise source. In some embodiments, the first area that is identified as including the first noise source is identified based on being an area between a first device of the plurality of devices that has a determined noise score that is within the first noise score range and a second device of the plurality of devices that has a determined noise score that is within the second noise score range. In some embodiments, the area that is identified as including the first noise source is identified based on identifying a portion of the network that resides between a first group of devices of the plurality of devices that have determined noise scores that are within the first noise score range and a second group of device of the plurality of devices that have determined noise score that are within the second noise score range. In some embodiments, the technique displays a visual indication (highlight the area with a flashing or bright color) of the first area identified as including the noise first source.

In some embodiments, the at least two respective devices are at least three respective devices of the plurality of devices that are attached to the one or more channels, and displaying, on the map, visual indications of the at least two respective devices (e.g., all devices) of the plurality of devices that are attached to the one or more channels (e.g., without displaying visual indications for devices not connected to the one or more channels that are affected by upstream noise) includes: in accordance with a determination, at block 512, that the determined noise score of the respective device is within a third noise score range, the visual indication of the respective device is displayed, at block 518, with a third characteristic (e.g., a third appearance, a third color, a third size, a third brightness) without having the first characteristics and without having the second characteristic (e.g., thereby allowing for visual differentiation among devices with determined noise scores within the first noise score range, within the second noise score range, and within the third noise score range).

In some embodiments, the electronic device identifies a second area (e.g., a geographical area, a portion of the network, a network segment, a network element) as including a second noise source. In some embodiments, the second area that is identified as including the second noise source is identified based on being an area between the second device of the plurality of devices that has a determined noise score that is within the second noise score range and a third device of the plurality of devices that has a determined noise score that is within the third noise score range. In some embodiments, the area that is identified as including the noise source is identified based on identifying a portion of the network that resides between the second group of devices of the plurality of devices that have determined noise scores that are within the second noise score range and a third group of devices of the plurality of devices that have determined noise score that are within the third noise score range. In some embodiments, the technique displays a visual indication of the second area identified as including the second noise source.

In some embodiments, the visual indications of the respective devices of the plurality of devices that are attached to the one or more channels are based on values according to the proximity of the respective devices to a source noise (e.g., the first noise source and/or the second noise source). In some embodiments, each device (e.g., modem) is assigned a value according to its proximity to the noise source, with each value corresponding to a characteristic (e.g., color gradient: ranging from blue to green to yellow to orange to red with red identifying modems that are closer to the noise source and blue indicating modems that are further from the noise source, color intensity gradient: more intense colors identifying modems that are closer to the noise source and lighter colors identifying modems that are farther from the noise source). Thus, the characteristic of the visual indication of respective devices on the map show the proximity of the respective modems to the noise source. In some embodiments, the proximity of the respective devices to the noise source is determined based on analysis of the modem's noise score.

In some embodiments, the electronic device determines, for at least the two devices of (e.g., for each device of) the plurality of devices that are attached to the one or more channels, respective noise scores (e.g., upstream noise scores and/or downstream noise scores) for a plurality of times (e.g., periodically, once a minute, once a day, once an hour for a week). The electronic device stores the respective noise scores for the plurality of times (e.g., in a local or remote database).

In some embodiments, the technique also stores, for each of the plurality of times, additional metrics (e.g., which devices are active, what the weather is at the device locations, whether a network parameter is enabled/disabled, the value of various network parameters) as part of a noise history.

In some situations, the noise in the network has an intermittent nature, appearing for a duration of time and disappearing for a duration of time. In some embodiments, the technique stores information for localizing noise coining from more than one source and location. This noise history can be used to detect the noise signature and to determine how the noise varies over times (e.g., when the noise exists, when it is reduced, when it does not exist). In some embodiments, the map is concurrently displayed with a control element (e.g., a slider). The positions on the control element correspond to various times (e.g., times at which noise information was stored for the plurality of devices). Input is received at the control element (e.g., mouse input to move a selected along the slider). As the input is received at the control element, the device updates display of the characteristics of the respective devices to correspond to various downstream noise scores corresponding to various times (of the historical data). Thus, the user can see how the noise impacts the devices on the network over time.

In some embodiments, the technique automatically removes or de-emphasizes representations of devices from the map when the noise scores for those devices vary less than a threshold variance amount. Thus, the map provides a clearer representation of the devices that have noise scores that vary over the plurality of times.

FIGS. 6A-6D illustrate exemplary user interfaces for analyzing a network, in accordance with some embodiments. The techniques described with respect to these figures are performed by an electronic device (e.g., a computer) with a display. The electronic device includes one or more processors and memory. The memory includes one or more programs configured to be executed by the one or more processors. The one or programs include instructions for performing the techniques, as outlined below.

Figure 6A:
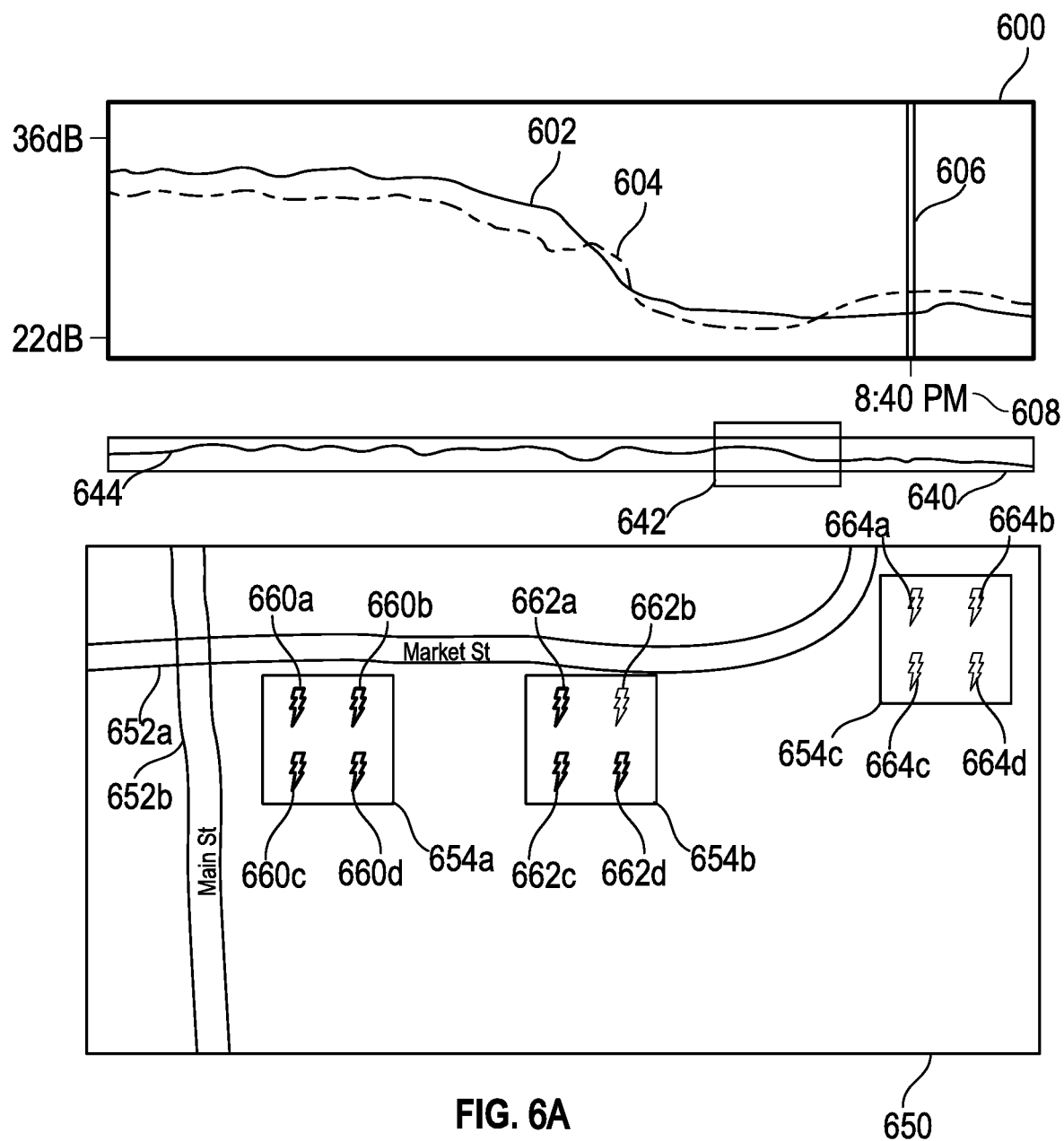
FIGS. 6A-6D illustrate exemplary user interfaces for analyzing a network, in accordance with some embodiments.

At FIG. 6A, the computer concurrently displays network graph 600, extended network graph 640, and map 650. Network graph 600 includes plotted lines 602 and 604. In some examples, lines 602 and 604 correspond to SNR of a channel in dB (Y-axis) as plotted over time (X-axis). In some examples, lines 602 and 604 correspond to Codeword Error Rate (CER) of a channel in quantity (or percentage) (Y-axis) as plotted over time (X-axis). In some examples, line 602 corresponds to SNR of a channel in dB (Y-axis) as plotted over time (X-axis) and line 604 corresponds to CER of the channel in quantity (or percentage) (Y-axis) as plotted over time (X-axis). For example, the channel is an upstream channel. In some examples, network graph 600 concurrently includes a plurality of plotted lines representing: (1) SNR of a first upstream channel, (2) CER of the first upstream channel, (3) SNR of a second upstream channel, and (4) CER of the second upstream channel.

The computer has received user input identifying time 8:40 pm on network graph 600, such as through activation of a computer mouse while the mouse pointer is located at the 8:40 pm location on the network graph 600. As a result, the computer has displayed selection line 606 and time indicator 608, both of which correspond to (and indicate) the selection of time 8:40 in network graph 600.

Extended network graph 640 provides a view of network information 644 that extends beyond the view provided by network graph 600. Selection window 642 indications which portion (e.g., corresponding to a certain duration) of extended network 640 is currently being displayed in network graph 600. For example, graphed network information 644 in selection 642 may be based on a combination (e.g., sum, avg) of the data represented by lines 602 and 604. User input to move selection window 642 causes a corresponding update of the graphs in network graph 600. User input that increases or decreases the size (width) of selection window 642 causes a corresponding display in network graph 600. As a result, a user can provide input (e.g., by dragging the sides of selection window 642) to increase or decrease the duration of time represented in network graph 600.

Map 650 provides a visual display of a geographical area, such as a portion of a city. The area actively displayed can be translated, zoomed in, and zoomed out based on user input. Map 650 includes representations of roads 652a-652b and buildings 654a-654c, situated in accordance with the represented geographical location (e.g., city). Map 650 also includes visual representations of cable modems 660-664 deployed within the geographical area. In this example, three buildings 654a-654c are displayed along with the corresponding cable modems 660-664 deployed at those buildings.

Based on the user selection of time 8:40 pm in network graph 600, the computer has displayed cable modems 660-664 with particular visual characteristics—some devices are displayed in one color while other devices are displayed in a different color. For example, the computer accesses historical network information for modem 662c for 8:40 pm on the relevant (e.g., selected) day. The computer calculates a noise score for modem 662c based on multiple parameters of modem 662c at 8:40 pm. In some examples, the noise score is calculated using a plurality of parameters particular to modem 662c for 8:40 pm, the parameters selected from among the above-described categories: (1) parameters obtained directly from the modems and/or CMTSes, (2) parameters calculated using category 1 parameter values (e.g., parameters obtained directly from modems/CMTSes), (3) parameters obtained by analyzing variations of the category 1 and 2 parameters over time (e.g., over a single channel), (4) parameters obtained by analyzing variations of parameters of category 1 and 2 over multiple channel frequencies (e.g., at a single point in time), (5) parameters obtained from combining the parameters in categories 1, 2, 3 and 4, and (6) calculated parameters that show dependencies and/or correlation between the parameters in any two or more of categories 1, 2, 3, 4 and 5. For example, the computer calculates a noise score for each of the modems 660-664.

The computer displays cable modems 660-664 with visual characteristics based on their respective calculated noise scores. Devices that have a noise score that exceeds a threshold value are displayed in dark colors, such as devices 660a-660d, 662a, 662c-662d. Devices that have a noise score that does not exceed the threshold value are displayed in light colors, such as devices 662b and 664a-664d. This provides the user with a visual indication of the noise score of the devices at the selected time (8:40 pm). Accordingly, the user can better understand where noise may be entering the network and negatively affecting the performance (and thus noise score and health) of the modems on the network.

Figure 6B:
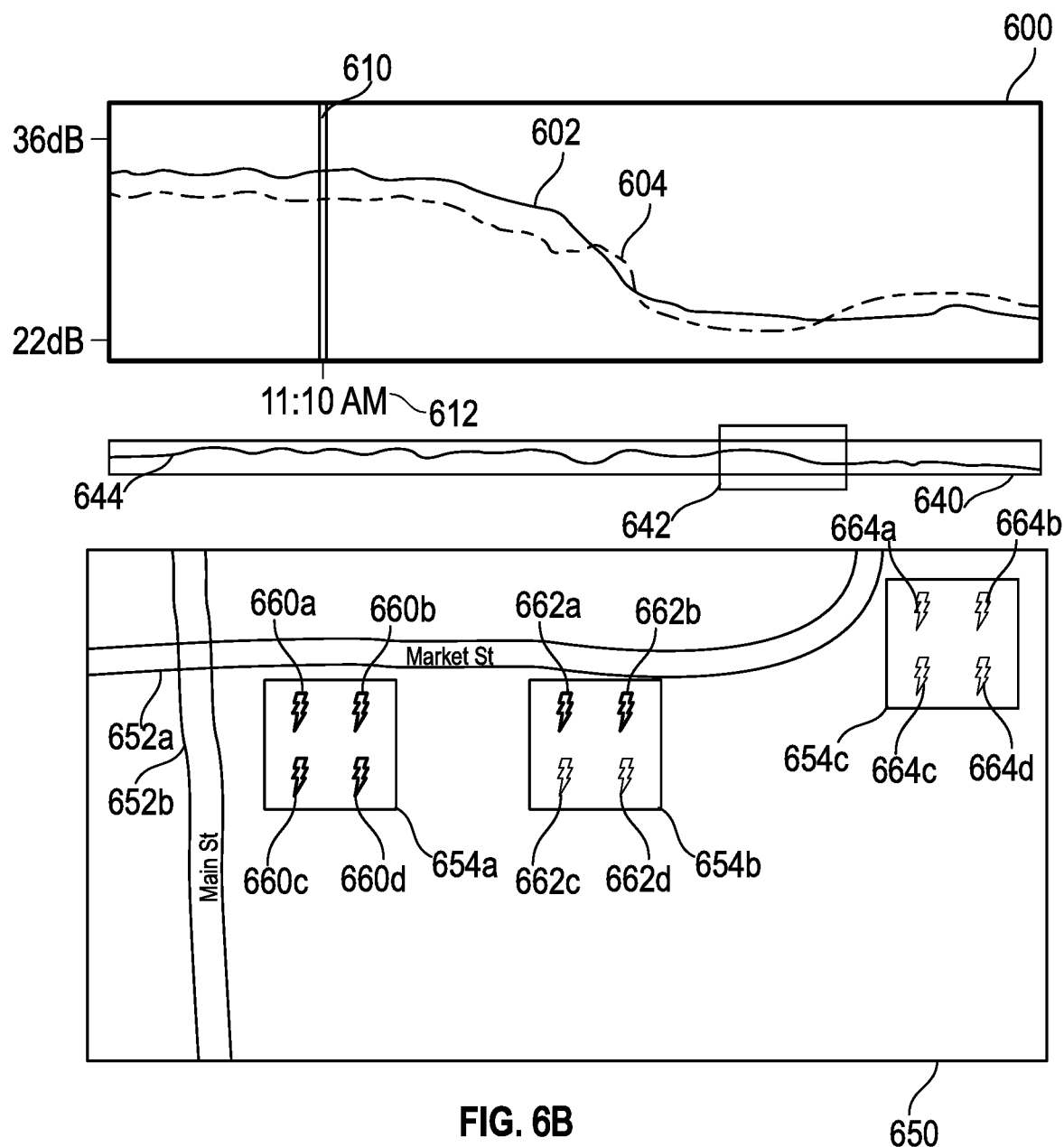

At FIG. 6B, the computer receives user input identifying time 11:10 am on network graph 600, such as through activation of a computer mouse while the mouse pointer is located at the 11:10 am location on the network graph 600. As a result, the computer displays selection line 610 and time indicator 612, both of which correspond to (and indicate) the selection of time 11:10 am in network graph 600. In addition, map 650 is updated to reflect the noise scores of modems 660-664 for time 11:10 am of the relevant (e.g., selected) day. The computer updates the colors of modems 660-664 based on calculated respective noise scores for the modems for 11:10 am. In this example, modems 660 continue to exceed the threshold value and continue to be displayed in the dark colors and modems 664 continue to not exceed the threshold value and continue to be displayed in the light colors. Importantly, the colors of some of the group of modems in building 654b has changed based on their noise score exceeding or not exceeding the threshold value. For example, the noise scores for modems 662c and 662d do not exceed the threshold value and, as a result, modems 662c and 662d are now displayed in a light color, as compared to previously being displayed in a dark color. For another example, the noise scores for modem 662b does exceed the threshold value and, as a result, modem 662b is now displayed in a dark color, as compared to previously being displayed in a light color. These changes in the noise score as different historical times are selected for analysis of network parameters indicate that a source of network impairment exists at or near those modems (modems 662a, 662c, 662d).

Figure 6C:
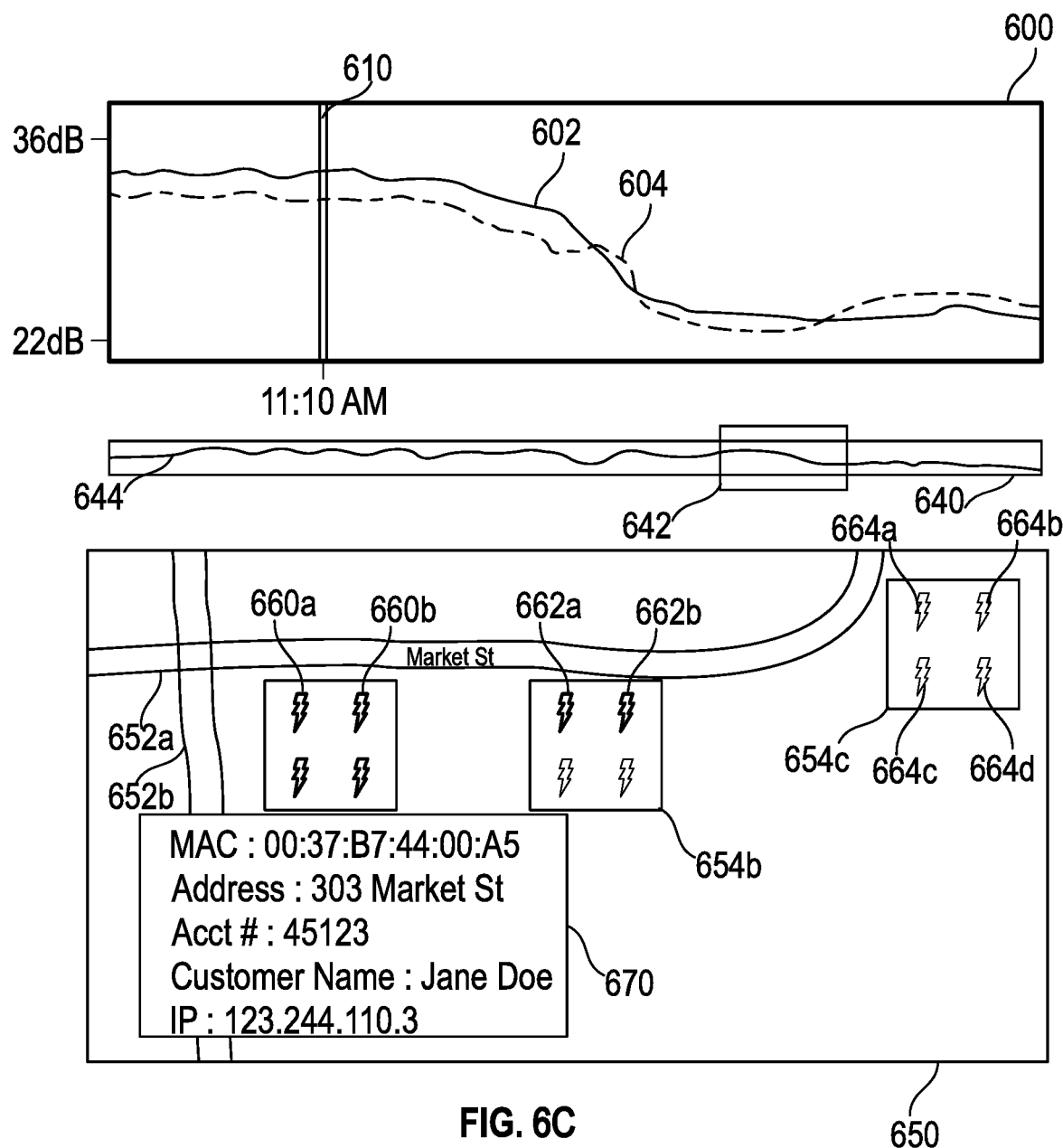

At FIG. 6C, the computer receives user input selected modem 662c and, in response, displays a pop-over details window 670 that includes details about modem 662c, including a MAC address of the modem, a street address at which the modem is deployed, an account number corresponding to the modem, a name of a customer corresponding to the account/modem, and an IP address corresponding to the modem. Accordingly, once the user identifies a potentially problematic modem, the user can quickly and efficiently access details about the potentially problematic modem so that any network impairments can be addressed quickly.

Figure 6D:
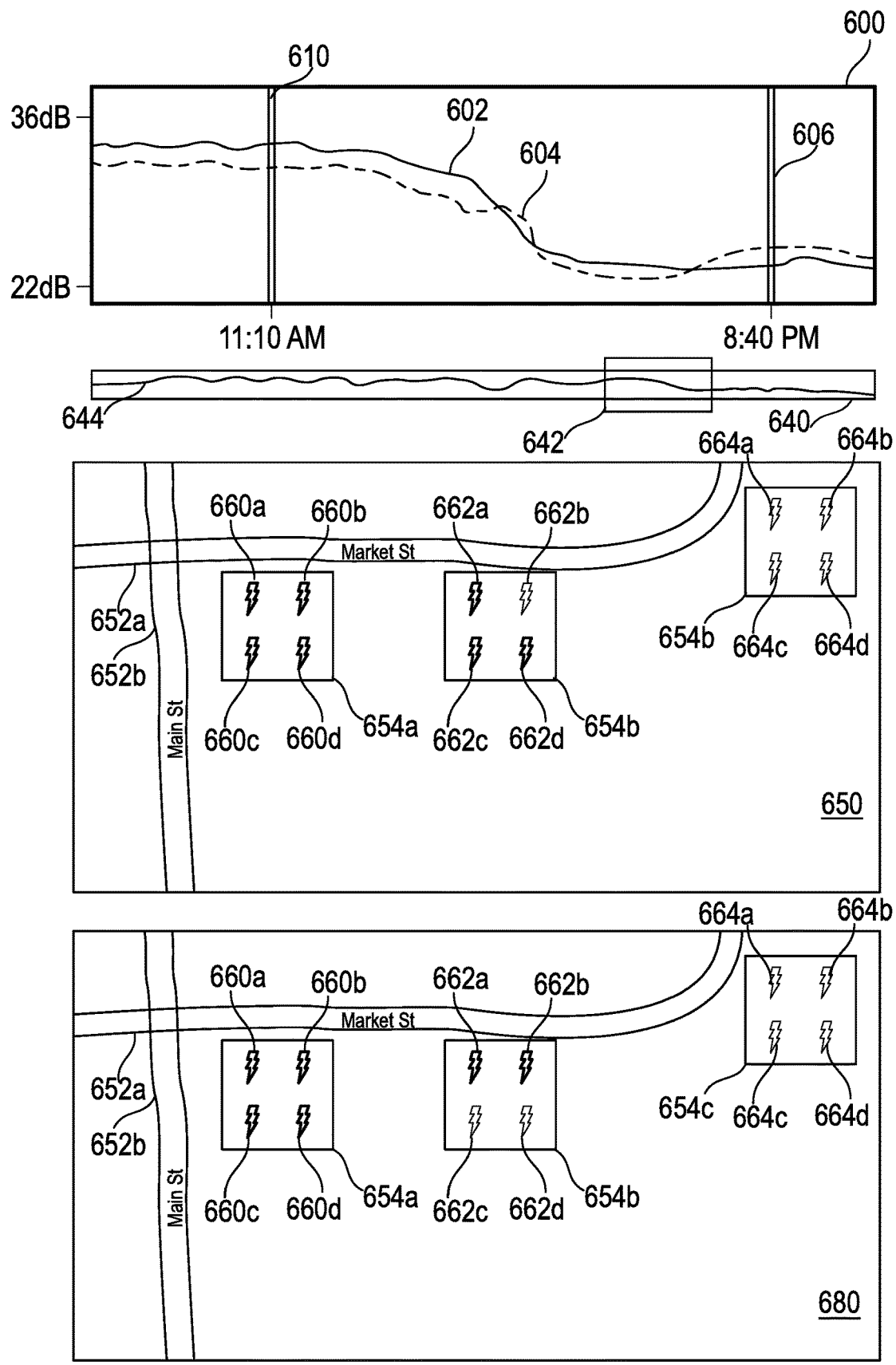

FIG. 6D is an alternative to FIG. 6B. In contrast to FIG. 6B, displays of map 500, selection line 606, and/or time indicator 608 are maintained when the computer receives the user input identifying time 11:10 am on network graph 600. Further, the computer displays, in response to receiving the user input identifying time 11:10 am, an additional selection line 610 and/or time indicator 610. Map 650 continues to reflect the noise scores of modems 660-664 for time 8:40 pm of the relevant (e.g., selected) day. In response to receiving the user input identifying time 11:10 am., second map 680 is updated (or newly displayed) and reflects the noise scores of modems 660-664 for time 11:10 am of the relevant (e.g., selected) day. Thus, the user can compare the status of the modems between the two selected times using the concurrently displayed maps, which correspond to the same map area.

FIG. 7 illustrates an exemplary flow diagram 700, in accordance with some embodiments. The technique for analyzing a network is performed at an electronic device (e.g., a computer) with an optional display, memory for storing computer instructions for the process, and one or more processors for executing the computer instructions.

At block 702, the technique concurrently displays: (a) a graphical representation (e.g., 602, 604) (or graphical representations) of a (or a plurality of) network quality metric (e.g., signal-to-noise ratio (SNR) based on signals received from multiple network devices (such as multiple (or all) network devices of the plurality of network devices); Codeword Error Rate (CER) (corrected and/or uncorrectables) based on signals received from multiple network devices (such as multiple (or all) network devices of the plurality of network devices)) graphed against a first duration of time (e.g., for one hour, from 9 am to 10 am) for a signal (or a plurality of signals) (e.g., a first signal corresponding to a first upstream channel, a second signal corresponding to a second upstream channel different from the first upstream channel; on which the plurality of network devices are deployed) and (b) a map (e.g., 650) of an area. The map (e.g., 650) includes concurrent display of: one or more geographical elements (e.g., roads, structures 654) of the area that are not network devices, and a plurality of network devices (e.g., 660, 662, 664). For example, the graphical representation (e.g., 602, 604) (or graphical representations) of a (or a plurality of) network quality metric is an SNR vs. time graph is displayed that includes (1) an average SNR for network devices on the first upstream channel and/or (2) an average SNR for network devices on the second upstream channel, both over the same time duration (e.g., over an hour).

At block 706, while displaying the graphical representation (or graphical representations) of the network quality metric for the signal (or a plurality of signals), the technique receives input selecting a first time (e.g., 608, 612) that is within the first duration of time. In some examples, an indication, such as a vertical line, is shown in response to receiving the input selecting the first time to indicate to the user the selected time. The vertical line optionally crosses the graphical representations of the plurality of signals at a location corresponding to the selected time.

At block 708, in response to receiving the input selecting the first time, the technique updates the map of the area to change a visual characteristic (e.g., a color, a size, a shape) of at least some of the displayed plurality of network devices (e.g., 660, 662, 664) based on a respective noise score for the corresponding network devices at the selected first time (e.g., and not based on a noise score for any other network device).

In accordance with some embodiments, the respective noise score for a network device is determined based on a plurality of network parameters, the plurality of network parameters including a first network parameter obtained directly from the network device and a second network parameter obtained by analyzing variations in a network parameter of the network device over time.

In accordance with some embodiments, the respective noise score for a network device is determined based on a plurality of network parameters, the plurality of network parameters including a first network parameter obtained directly from the network device and a third network parameter obtained by analyzing variations in a network parameter of the network device over multiple channel frequencies.

In accordance with some embodiments, the respective noise score for a network device is determined based on a plurality of network parameters, the plurality of network parameters including a first network parameter obtained directly from the network device and a fourth network parameter obtained by analyzing a dependency or correlation between at least two network parameters of the network device (e.g., at a point, for a single channel, over time, over multiple channels).

In accordance with some embodiments, updating the map of the area to change a visual characteristic (e.g., a color, a size, a shape) of at least some of the displayed plurality of network devices based on the noise score for the corresponding network devices at the selected first time comprises: determining a respective noise score for each of the plurality of network devices for the selected first time; determining whether the respective noise score for each respective network devices of the plurality of network devices meets a noise score criteria (e.g., noise score exceeds a threshold noise value, SNR is more than a threshold SNR value); updating the map of the area such that: respective network devices of the plurality of network devices that meet the device noise score criteria are displayed using a first visual appearance (e.g., a first color, a first size, a first shape) (without displaying those network devices with a second visual appearance), and respective network devices of the plurality of network devices that do not meet the noise score criteria are displayed using a second visual appearance different from the first visual appearance a second color, a second size, a second shape) (without displaying those network devices with the first visual appearance).

In accordance with some embodiments, updating the map of the area to change a visual characteristic (e.g., a color, a size, a shape) of at least some of the displayed plurality of network devices includes changing the visual characteristic of at least some network devices and maintaining the visual characteristic of at least some network devices.

In accordance with some embodiments, the technique receives selection of a network device of the plurality of network devices. In response to receiving selection of the network device, concurrently displaying two or more (or all) of (e.g., 670): a MAC address of the network device, a street address of the network device (e.g., the physical address at which the device is located, such as the address reflected in the map), and an account number of the network device (e.g., the account number corresponding to a network account for which a subscriber is responsible).

In accordance with some embodiments, the technique displays, concurrently with the graphical representation of a network quality metric graphed against time for a signals, second graphical representation (e.g., 640) of the network quality metric graphed (independent of the first graphical representation of the network quality metric) against a second duration of time (e.g., 8 am to 11 am), wherein the second duration of time includes the first duration of time, and wherein the second duration of time is longer than the first duration of time.

In accordance with some embodiments, the technique displays, concurrently with the graphical representation of the network quality metric for the signal, a graphical representation of the network quality metric (e.g., signal-to-noise ratio (SNR) based on signals received from multiple network devices (such as multiple (or all) network devices of the plurality of network devices); Codeword Error Rate (CER) (corrected and/or uncorrectables) based on signals received from multiple network devices (such as multiple (or all) network devices of the plurality of network devices)) graphed against the first duration of time (e.g., for one hour, from 9 am to 10 am) for a second signal (e.g., a second signal corresponding to a second upstream channel different from the first upstream channel; on which the plurality of network devices are deployed). For example, an SNR vs. time graph is displayed that includes an average SNR for network devices on the second upstream channel over the same time duration as the first signal (e.g., over an hour).

In accordance with some embodiments, the graphical representation of the network quality metric for the signal is in a first color (e.g., a first upstream channel). The graphical representation of the network quality metric for the second signal is in a second color (e.g., a second upstream channel different from the first upstream channel), the second color being different from the first color.

In accordance with some embodiments, while displaying the graphical representation (or graphical representations) of the network quality metric for the signal (or a plurality of signals) and the map of the area, the technique receives input selecting a second time (e.g., 612) that is within the first duration of time. In some examples, an indication, such as a second vertical line (e.g., 610), is shown in response to receiving the input selecting the second time to indicate to the user the selected time. The vertical line optionally crosses the graphical representations of the plurality of signals at a location corresponding to the selected second time. In response to receiving the input selecting the second time, the technique displays a second map (e.g., 680) of the area, concurrently with the first map of the area, that includes at least some of the displayed plurality of network devices with a visual characteristic (e.g., a color, a size, a shape) based on the respective noise score for the corresponding network devices at the selected second time (e.g., and not based on a noise score for any other network device).

In accordance with some embodiments, a respective noise score for a respective network device is calculated based on a make (or model) of the network device. In some examples, a noise score for a first network device is calculated differently from a noise score for a second network device based on the two network devices having different makes (or models) (even for the same noise score type). Thus, the noise score for the first network device is calculated with one set of weightings of the network parameters and the noise score for the second network device is calculated with a second set of weightings of the network parameters.

In accordance with some embodiments, determining a respective noise score for a respective network device for a time includes: determining a noise score type that is currently selected; in accordance with a determination that a first noise score type is currently selected: using, based on the first noise score type, a first set of network parameters (e.g., including a first network parameter) for the respective network device for the time to calculate the respective noise score (e.g., without using a second set of network parameters (e.g., that includes a second network parameter)); in accordance with a determination that a second noise score type is currently selected: using, based on the second noise score type, a second set of network parameters (e.g., including a second network parameter, the second set being different from the first set of network parameters) for the respective network device for the time to calculate the respective noise score (e.g., without using the first set of network parameters that include the first parameter).

For example, the first noise score type may be a calculation of an amount of correlation between power level and NMTER of a respective device for a time. For another example, the second noise score type may be a calculation of power level divided by upstream SNR of the respective network device. Thus, different calculations using different network parameters are used to determine a noise score for a respective device based on the selected noise score type.

In accordance with some embodiments, subsequent to determining the respective noise score types for the respective devices and subsequent to updating the map of the area to change the visual characteristic (e.g., a color, a size, a shape) of at least some of the displayed plurality of network devices based on the respective noise score for the corresponding network devices at the selected first time (e.g., and not based on a noise score for any other network device), the technique receives input to change the noise score type. In response to receiving input to change the noise score type, the technique updates the map of the area to change the visual characteristic (e.g., a color, a size, a shape) of at least some of the displayed plurality of network devices based on the updated respective noise score for the corresponding network devices at the selected time.

Thus, the user can provide input to select the noise score type thereby changing how the noise scores are calculated for the network devices. The change in the noise scores causes a corresponding change in how the network devices are displayed on the map. In some embodiments, the user can selected from among 5, 10, or more noise score types. By changing among various noise score types, the user can determined which (or whether any) of the noise score types produces results indicating the network impairment.

FIGS. 8A-8D illustrate exemplary user interfaces for analyzing a network, in accordance with some embodiments. The techniques described with respect to these figures are performed by an electronic device (e.g., a computer) with a display. The electronic device includes one or more processors and memory. The memory includes one or more programs configured to be executed by the one or more processors. The one or programs include instructions for performing the techniques, as outlined below.

Figure 8A:
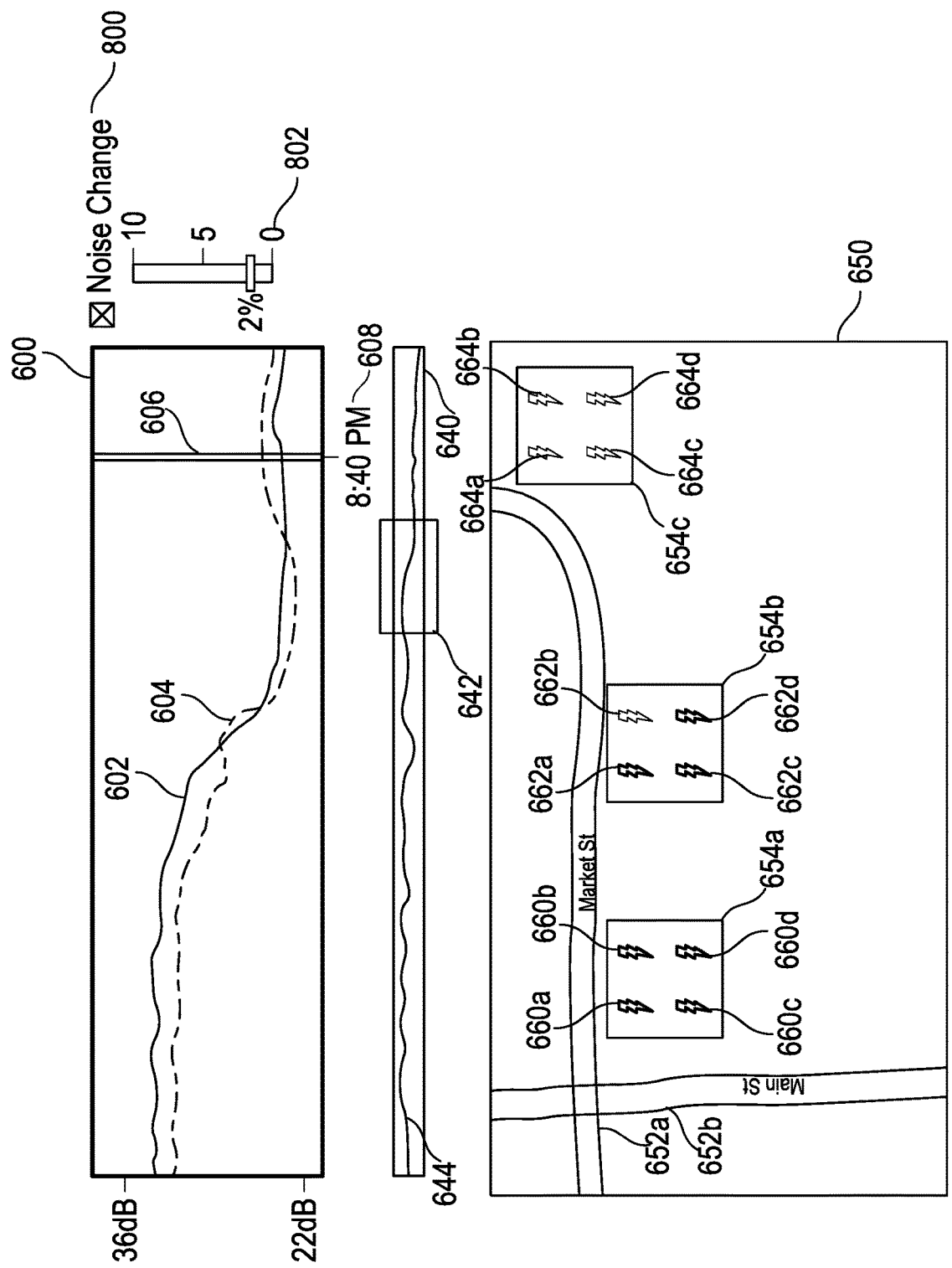
FIGS. 8A-8D illustrate exemplary user interfaces for analyzing a network, in accordance with some embodiments.

At FIG. 8A, the computer concurrently displays network graph 600, extended network graph 640, and map 650. The computer has received input activating noise change option 800, which enables the user to more easily visual changes in the noise score of modems. Slider 802 indicates that the change threshold is set at 2%.

The computer then receives user input identifying time 11:10 am on network graph 600, such as through activation of a computer mouse while the mouse pointer is located at the 11:10 am location on the network graph 600. As a result, the computer displays selection line 610 and time indicator 612, both of which correspond to (and indicate) the selection of time 11:10 am in network graph 600. The computer determines, for each modem 660-664 a difference between the respective modem's noise score for time 8:40 pm and for time 11:10 am. The computer then visually differentiates between modems that have a difference that meets the change threshold set using slider 802 as part of noise change option 800.

Figure 8B:
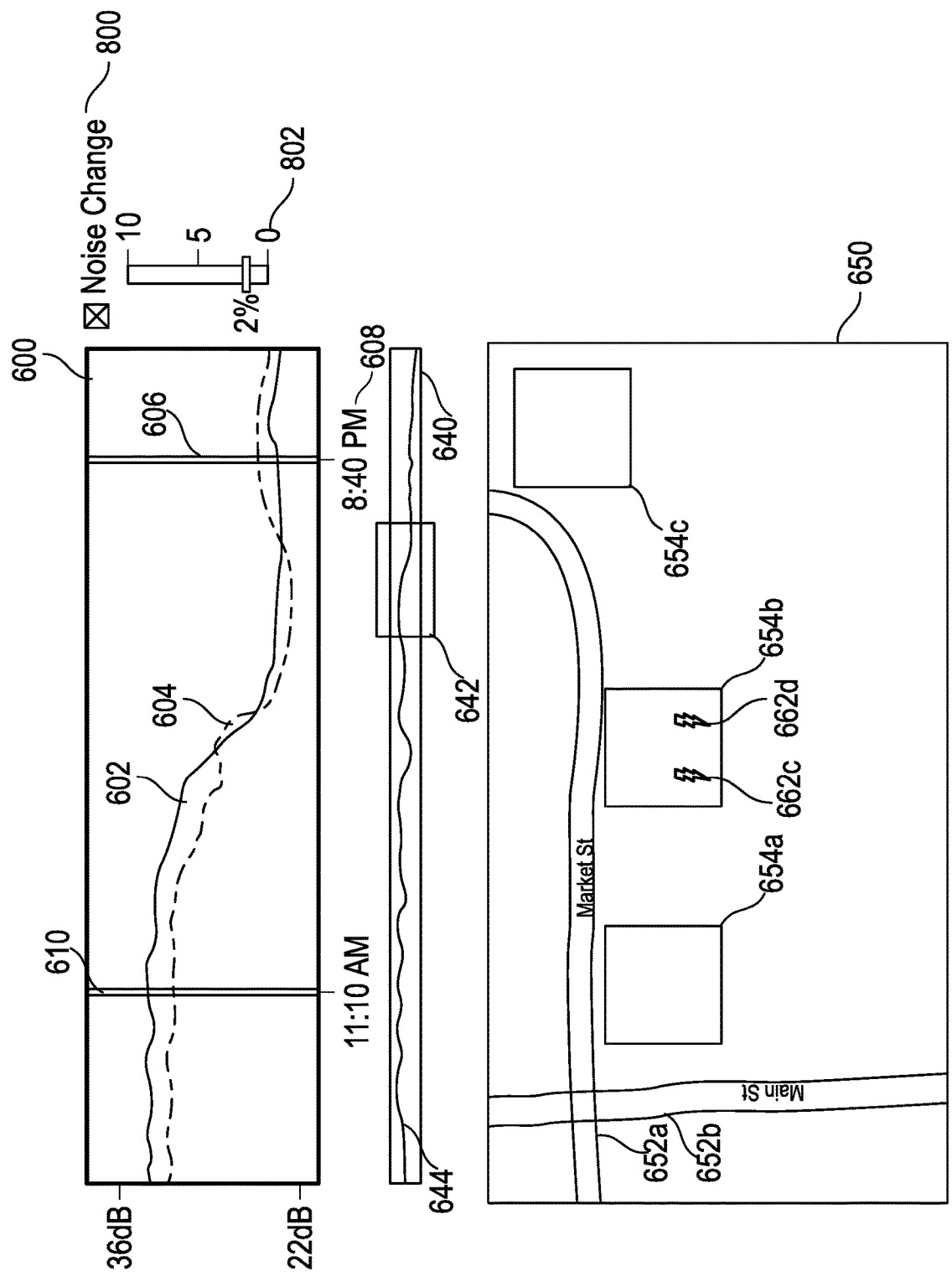

In some examples, as illustrated in FIG. 8B, the computer displays modems 662c-662d that meet the change threshold and ceases to display modems 660, 662a-662b, and 664 that do not meet the change threshold. This provides the user with a visual indication of devices that have had large changes in their noise score between the two selected times. Accordingly, the user can better understand where noise may be entering the network and negatively affecting the performance (and thus noise score and health) of the modems on the network.

Figure 8C:
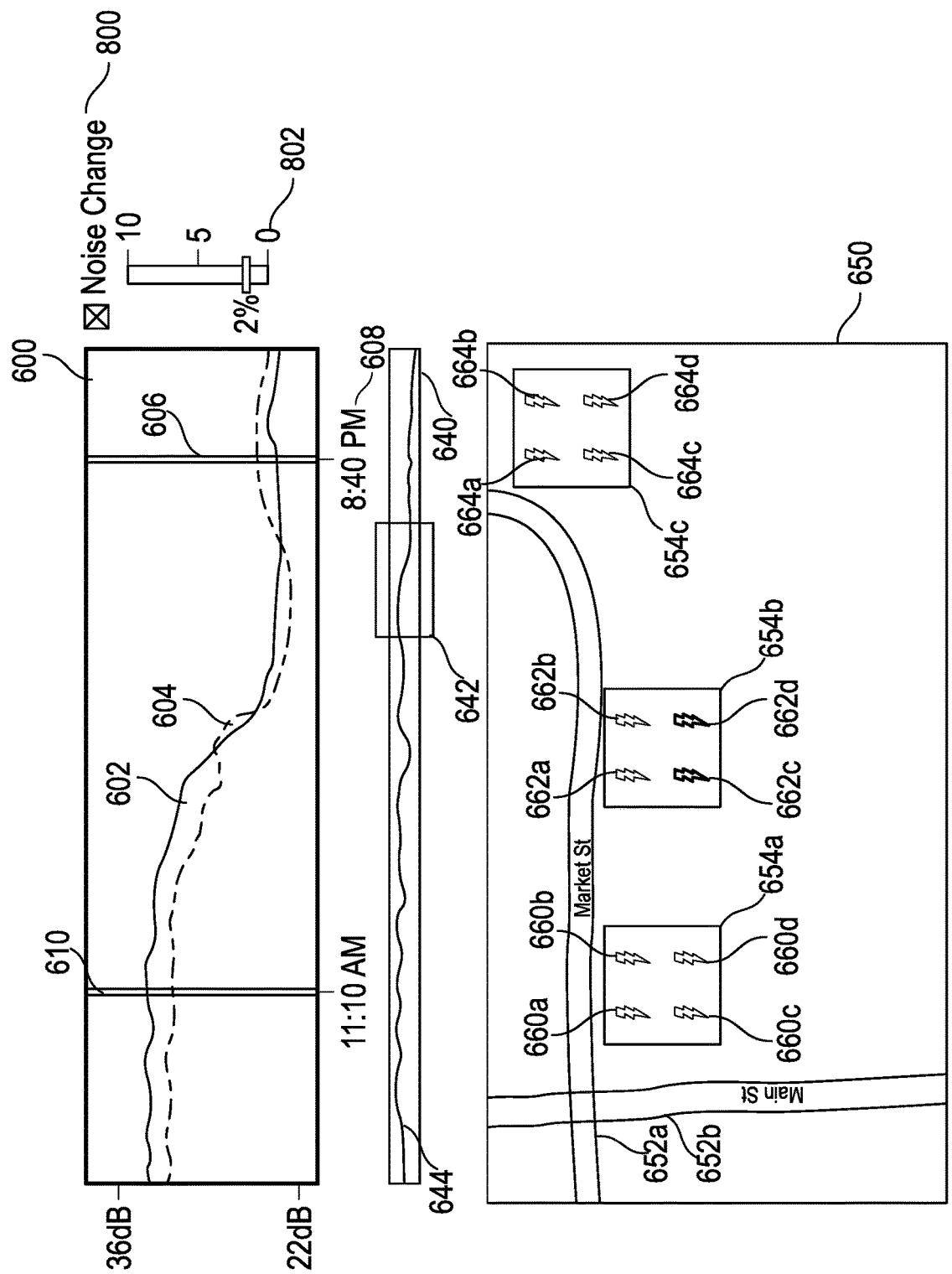

In some examples, as illustrated in FIG. 8C, the computer displays modems 662c-662d that meet the change threshold using a darker color and displays modems 660, 662a-662b, and 664 that do not meet the change threshold using a lighter color. Thus, modems 662c-662d each experienced a change in their respective noise score that exceeded 2% between the two selected times. Modems 660, 662a-662b, and 664 each experienced a change in their respective noise score that did not exceed 2% between the two selected times. This provides the user with a visual indication of devices have had large changes in their noise score between the two selected times. Accordingly, the user can better understand where noise may be entering the network and negatively affecting the performance (and thus noise score and health) of the modems on the network.

In some examples (e.g., as can be implemented in both FIGS. 8B and 8C), modems are also visually differentiated based on the degree to which there is a difference between the respective modem's noise score for time 8:40 pm and for time 11:10 am. In FIG. 8C, for example, modem 662c can be a darker color than modem 662d when the determined change for modem 662c is more than the determined change for modem 662d. Similarly, modems that do not meet the change threshold can also be similarly visually differentiated based on the degree to which there is a difference between the respective modem's noise score for time 8:40 pm and for time 11:10 am.

Figure 8D:
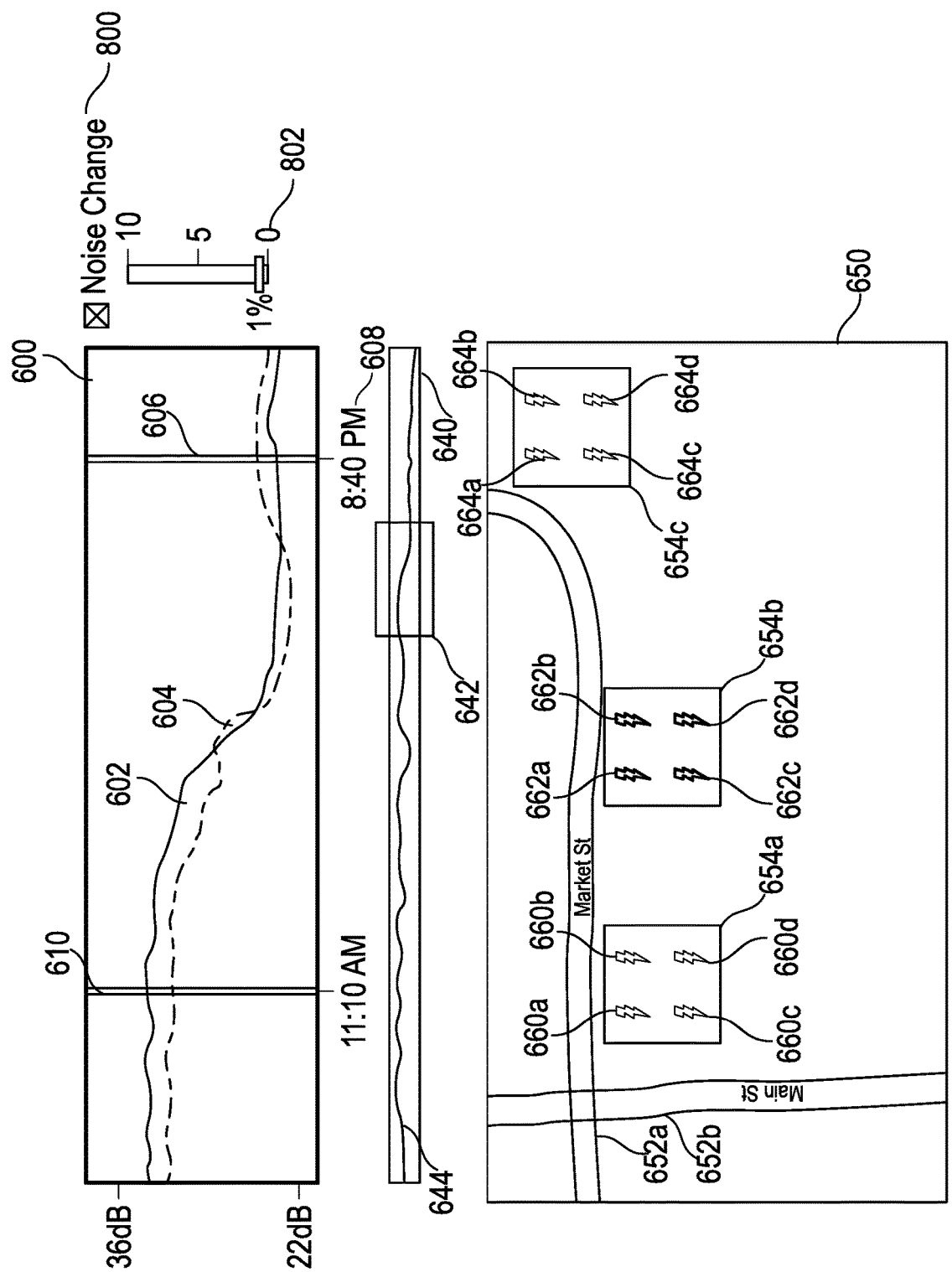

While the computer is displaying the interface of FIG. 8C, the computer receives user input that updates the change threshold to be set at 1%, as shown in FIG. 8D. For example, the computer receives mouse input activating slider 802 to indicate the change threshold is set at 1%. In response, the computer updates map 650, as shown in FIG. 8D, to visually differentiate between modems 662 that meet the updated 1% change threshold (e.g., using a dark color) and modems 660 and 664 that do not meet the updated 1% change threshold (e.g., using light colors or not displaying those modems). This provides the user with a visual indication of devices that had at least the threshold amount of change in their noise score between the two selected times. Accordingly, the user can better understand where noise may be entering the network and negatively affecting the performance (and thus noise score and health) of the modems on the network.

Once the user identifies a potentially problematic modem using this technique, the user can quickly and efficiently access details about the potentially problematic modem so that any network impairments can be addressed quickly.

Figure 9B:
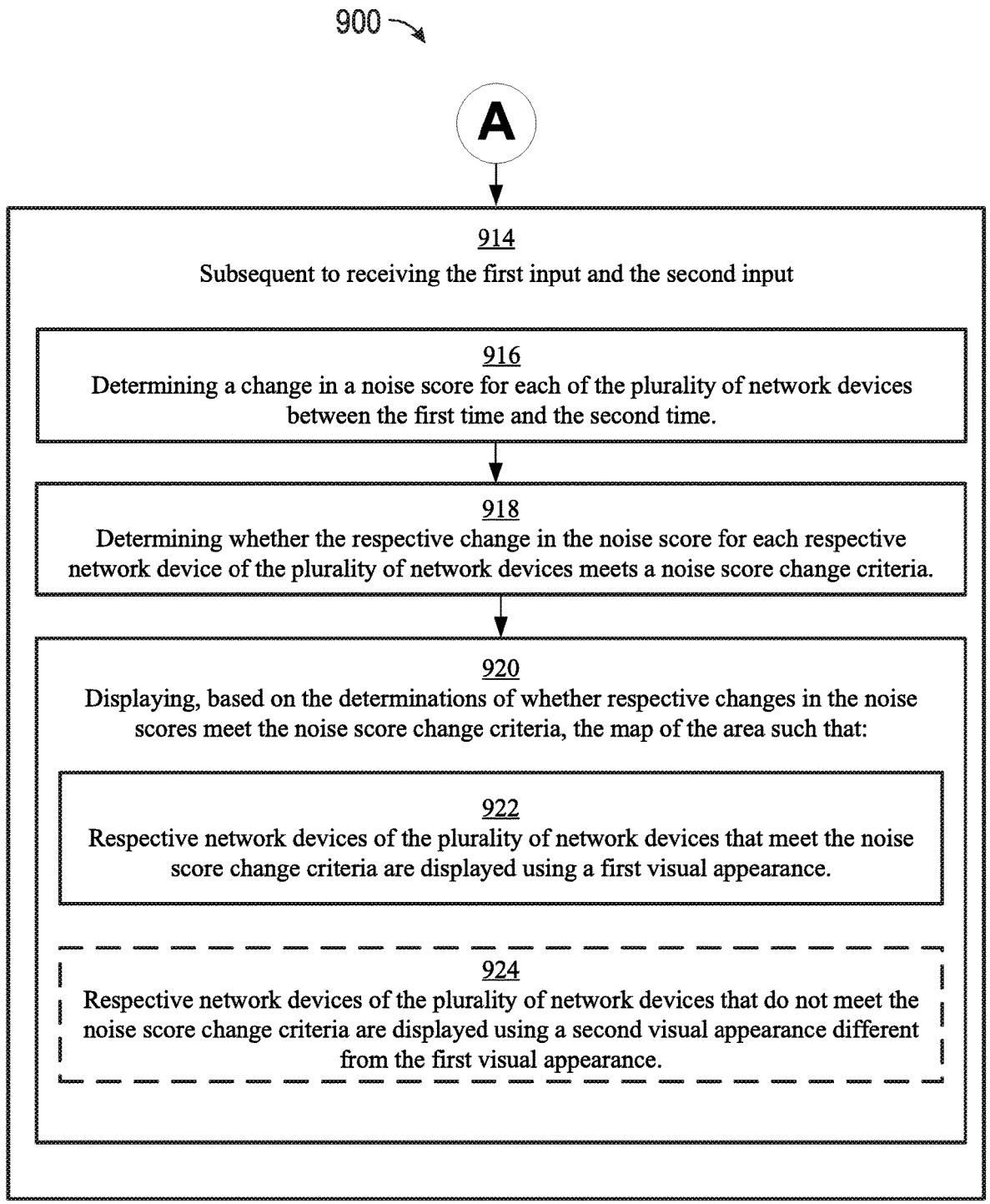

FIGS. 9A-9B illustrates an exemplary flow diagram 900, in accordance with some embodiments. The technique for analyzing a network is performed at an electronic device (e.g., a computer) with an optional display, memory for storing computer instructions for the process, and one or more processors for executing the computer instructions.

At block 902, the technique concurrently displays: (a) a graphical representation (e.g., 602, 604) of a network quality metric (e.g., signal-to-noise ratio (SNR) based on signals received from multiple network devices (such as multiple (or all) network devices of the plurality of network devices); Codeword Error Rate (CER) (corrected and/or uncorrectables) based on signals received from multiple network devices (such as multiple (or all) network devices of the plurality of network devices)) graphed against a first duration of time (e.g., for one hour, from 9 am to 10 am) for a signal (e.g., a first signal corresponding to a first upstream channel on which the plurality of network devices are deployed) and (b) a map (e.g., 650) of an area. For example, graphical representation (e.g., 602, 604) of a network quality metric is an average SNR for network devices on an upstream channel vs. time graph is displayed that includes SNR for the first upstream channel over the time duration (e.g., over an hour).

At block 904, the map includes concurrent display of: one or more geographical elements (e.g., roads, structures 654) of the area that are not network devices, and a plurality of network devices (e.g., 660, 662, 664) (e.g., a cable modem, a cable modem termination system).

At block 906, while displaying the graphical representation of the network quality metric for the signals, the technique receives first input selecting a first time (e.g., 608) that is within the first duration of time. In some examples, an indication, such as a vertical line, is shown in response to receiving the input selecting the first time to indicate to the user the selected time. The vertical line optionally crosses the graphical representation of the signal.

At block 908, in response to receiving the first input, the technique displays a first visual indicator (e.g., 606) corresponding to the first time in the graphical representation of the network quality metric.

At block 910, while displaying the graphical representation of the network quality metric for the signals, the technique receives second input selecting a second time (e.g., 612), different from the first time, that is within the first duration of time. In some examples, an indication, such as a vertical line, is shown in response to receiving the input selecting the second time to indicate to the user the selected time. The vertical line optionally crosses the graphical representation of the signal.

At block 912, in response to receiving the second input, the technique displays a second visual indicator (e.g., 610) corresponding to the second time in the graphical representation of the network quality metric.

At block 914, subsequent to (e.g., in response to) receiving the first input and the second input, the technique performs blocks 916-924.

At block 916, the technique determines a change in a noise score for each of the plurality of network devices between the first time and the second time.

At block 918, the technique determines whether the respective change in the noise score for each respective network device of the plurality of network devices meets a noise score change criteria (e.g., 802) (e.g., change in noise score exceeds a threshold change in noise score, change in device SNR is more than a threshold SNR change value).

At block 920, the technique displays (e.g., updating), based on the determinations of whether respective changes in the noise scores meet the noise score change criteria, the map (e.g., 650) of the area such that: (at block 922) respective network devices of the plurality of network devices that meet the noise score change criteria are displayed using a first visual appearance (e.g., a first color, a first size, a first shape) (without displaying those network devices with a second visual appearance) and, in accordance with some embodiments, (at block 924) respective network devices of the plurality of network devices that do not meet the noise score change criteria are displayed using a second visual appearance different from the first visual appearance (e.g., a second color, a second size, a second shape) (without displaying those network devices with the first visual appearance).

In accordance with some embodiments, subsequent to (e.g., in response to) receiving the first input and the second input: the technique displays (e.g., updating), based on the determinations of whether respective changes in the noise scores meet the noise score change criteria, the map (e.g., 650) of the area such that: respective network devices of the plurality of network devices that do not meet the noise score change criteria are not displayed (e.g., cease to be displayed).

In accordance with some embodiments, the noise score change criteria is met for a respective network device when a change in the noise score of the network device between the first time and the second time exceeds a threshold change value (e.g., exceeds an amount of change as a percentage or in db). The threshold change value is provided by user input (e.g., via 800, 802 the threshold change value is a threshold change that is user-programmable, such as via user input on a slider element).

In accordance with some embodiments, the noise score change criteria is met for a respective network device when the respective network device is categorized has having an amount of change in the noise score of the network device between the first time and the second time that falls within a top number of network devices (e.g., display/identify the network devices with the largest changes in noise score, such as the top 5 or top 10 devices with the most change). In accordance with some embodiments, the threshold change value is provided by user input (e.g., the threshold change value is a threshold change that is user-programmable, such as via user input on a slider element).

In accordance with some embodiments, the visual appearance of respective network devices of the plurality of network devices (e.g., that meet the noise score change criteria, that do not meet the noise score change criteria) are displayed using a variable value (e.g., varying intensity, varying brightness, varying size). The variable value is based on a magnitude of the change in the noise score of the network device between the first time and the second time. In some examples, a network device that has a larger change in SNR between the first time and the second time is displayed in a darker color (e.g., dark blue) than a network device that has a smaller change in SNR between the first time and the second time (e.g., displayed in light blue), although both network devices exceed the threshold value.

In accordance with some embodiments, the technique receives selection of a network device of the plurality of network devices. In response to receiving selection of the network devices, concurrently displaying two or more (or all) of (e.g., 670): a MAC address of the network device, a street address of the network device (e.g., the physical address at which the device is located), and an account number of the network device (e.g., the account number corresponding to a network account for which a subscriber is responsible).

In accordance with some embodiments, the technique displays, concurrently with the graphical representation of the network quality metric graphed against time for the signal, second graphical representation (e.g., 640) of the network quality metric graphed against a second duration of time (e.g., 8 am to 11 am), wherein the second duration of time includes the first duration of time, and wherein the second duration of time is longer than the first duration of time.

In accordance with some embodiments, the technique displays, concurrently with the graphical representation of the network quality metric for the signal, a graphical representation of the network quality metric (e.g., signal-to-noise ratio (SNR) based on signals received from multiple network devices (such as multiple (or all) network devices of the plurality of network devices); Codeword Error Rate (CER) (corrected and/or uncorrectables) based on signals received from multiple network devices (such as multiple (or all) network devices of the plurality of network devices)) graphed against the first duration of time (e.g., for one hour, from 9 am to 10 am) for a second signal (e.g., a second signal corresponding to a second upstream channel different from the first upstream channel; on which the plurality of network devices are deployed). For example, an SNR vs. time graph is displayed that includes an average SNR for network devices on the second upstream channel over the same time duration as the first signal (e.g., over an hour).

In accordance with some embodiments, the graphical representation of the network quality metric for the signal is in a first color (e.g., a first upstream channel). The graphical representation of the network quality metric for the second signal is in a second color (e.g., a second upstream channel different from the first upstream channel), the second color being different from the first color.

In accordance with some embodiments, a respective noise score for a respective network device is calculated based on a make (or model) of the network device. In some examples, a noise score for a first network device is calculated differently from a noise score for a second network device based on the two network devices having different makes (or models) (even for the same noise score type). Thus, the noise score for the first network device is calculated with one set of weightings of the network parameters and the noise score for the second network device is calculated with a second set of weightings of the network parameters.

In accordance with some embodiments, determining a respective noise score for a respective network device for a time includes: determining a noise score type that is currently selected; in accordance with a determination that a first noise score type is currently selected: using, based on the first noise score type, a first set of network parameters (e.g., including a first network parameter or including a category 1 parameter, as described above) for the respective network device for the time to calculate the respective noise score (e.g., without using a second set of network parameters (e.g., that includes a second network parameter) or without including a category 3 parameter, as described above); in accordance with a determination that a second noise score type is currently selected: using, based on the second noise score type, a second set of network parameters (e.g., including a second network parameter, the second set being different from the first set of network parameters, or including a category 3 parameter, as described above) for the respective network device for the time to calculate the respective noise score (e.g., without using the first set of network parameters that include the first parameter or without including any category 1 parameter, as described above).

For example, the first noise score type may be a calculation of an amount of correlation between power level and NMTER of a respective device for a time. For another example, the second noise score type may be a calculation of power level divided by upstream SNR of the respective network device. Thus, different calculations using different network parameters are used to determine a noise score for a respective device based on the selected noise score type.

In accordance with some embodiments, subsequent to displaying (e.g., updating), based on the determinations of whether respective changes in the noise scores meet the noise score change criteria, the map of the area, the technique receives input to change the noise score type. In response to receiving input to change the noise score type: the technique determines updated respective noise scores for respective network devices for the first time and the second time and the technique determines whether a respective change in the noise score for each respective network device of the plurality of network devices meets the noise score change criteria (e.g., change in noise score exceeds a threshold change in noise score, change in device SNR is more than a threshold SNR change value). The technique updates (e.g., updating), based on the determinations of whether respective changes in the noise scores meet the noise score change criteria, the map of the area to change the visual characteristic (e.g., a color, a size, a shape) of at least some of the displayed plurality of network devices.

Thus, the user can provide input to select the noise score type thereby changing how the noise scores are calculated for the network devices. The change in the noise scores causes a corresponding change in how the network devices are displayed on the map. In some embodiments, the user can selected from among 5, 10, or more noise score types. By changing among various noise score types, the user can determined which (or whether any) of the noise score types produces results indicating the network impairment.

In accordance with some embodiments, a technique for analyzing a network comprises: determining a first time at which a first type of network impairment is negatively affecting the network; determining a second time at which the first type of network impairment is not negatively affecting the network or is negatively affecting the network less than at the first time; calculating, for each of a plurality of network devices of the network: a first noise score for the first time using a first calculation; a second noise score for the first time using a second calculation different from the first calculation; a third noise score for the second time using the first calculation; and a fourth noise score for the second time using the second calculation; determining, for each of the plurality of network devices: a first difference score by calculating a difference between the first noise score and the third noise score for the respective network device; and a second difference score by calculating a difference between the second noise score and the fourth noise score for the respective network device; identifying the first calculation as an indicator of the first type of network impairment when a subset of the plurality of network devices have first difference scores that exceed a threshold difference; and identifying the second calculation as an indicator of the first type of network impairment when a subset of the plurality of network devices have second difference scores that exceed the threshold difference.

The foregoing description has been described with reference to specific embodiments. However, the illustrative discussions above are not intended to be exhaustive or to limit the invention to the precise forms described. Many modifications and variations are possible in view of the above teachings. Others skilled in the art are thereby enabled to best utilize the techniques and various embodiments with various modifications as suited to various uses.

Although the disclosure and examples have been described with reference to the accompanying drawings, it is to be noted that various changes and modifications will become apparent to those skilled in the art. Such changes and modifications are to be understood as being included within the scope of the disclosure.

What is claimed is:

1. A method for noise analysis in a network, comprising:
   determining upstream SNR values for a plurality of upstream channels;
   identifying a noisy upstream channel based on whether the determined upstream SNR values for channels of the plurality of upstream channels meet a noisy channel criteria; and
   identifying a plurality of suspect devices associated with the noisy upstream channel based on respective devices of the plurality of suspect devices meeting a set of one or more suspect criteria, wherein the set of one or more suspect criteria includes a channel criterion that is met for a respective device when the respective device has communicated on the noisy upstream channel.

2. The method of claim 1, wherein the set of one or more suspect criteria includes a pre-equalizer criterion that is met for the respective device based on a pre-equalizer coefficient of the respective device.

3. The method of claim 1, wherein the set of one or more suspect criteria includes an upstream transmit power level criterion that is met for the respective device when a determined upstream transmit power level value for the respective device exceeds an upstream transmit power level threshold.

4. The method of claim 1, wherein the set of one or more suspect criteria includes an upstream transmit power level standard deviation criterion that is met for the respective device when a determined upstream transmit power level standard deviation value for the respective device exceeds an upstream transmit power level standard deviation threshold.

5. The method of claim 1, wherein the set of one or more suspect criteria includes an NMTER (non-main tap energy to total tap energy ratio) criterion that is met for the respective device when a determined NMTER value for the respective device exceeds an NMTER threshold.

6. The method of claim 1, wherein the set of one or more suspect criteria includes an NMTER (non-main tap energy to total tap energy ratio) standard deviation criterion that is met for the respective device when a determined NMTER standard deviation value for the respective device exceeds an NMTER standard deviation threshold.

7. The method of claim 1, wherein the set of one or more suspect criteria includes a power level-to-NMTER (non-main tap energy to total tap energy ratio) correlation criterion that is met for the respective device when a determined power level-to-NMTER correlation value for the respective device exceeds a power level-to-NMTER correlation threshold.

8. The method of claim 1, wherein the set of one or more suspect criteria includes an NMITE (non-main tap individual tap energy) criterion that is met for the respective device when a determined NMITE value for the respective device exceeds an NMITE threshold.

9. The method of claim 1, wherein the set of one or more suspect criteria includes an SNR (signal-to-noise ratio) criterion that is met for the respective device when a determined SNR value for the respective device does not exceed an SNR threshold.

10. The method of claim 1, wherein the set of one or more suspect criteria includes an SNR (signal-to-noise ratio) standard deviation criterion that is met for the respective device when a determined SNR standard deviation value for the respective device exceeds an SNR standard deviation threshold.

11. The method of claim 1, wherein the set of one or more suspect criteria includes a CER (codeword error rate) criterion that is met for the respective device when a determined CER value for the respective device exceeds a CER threshold.

12. The method of claim 1, further comprising:
   determining whether a quantity of devices of the plurality of suspect devices meets a quantity metric;
   in accordance with a determination that the quantity of devices of the plurality of suspect devices does not meet the quantity metric:
      adjusting one or more of:
         an upstream transmit power level threshold,
         an upstream transmit power level standard deviation threshold, an NMTER (non-main tap energy to total tap energy ratio) threshold,
an NMTER standard deviation threshold,
an NMITE (non-main tap individual tap energy) threshold,
an SNR threshold,
an SNR standard deviation threshold, and
a CER threshold; and
subsequent to the adjusting, updating the identified plurality of suspect devices based on respective devices of the plurality of devices meeting the set of one or more suspect criteria with at least one adjusted threshold value.

13. The method of claim 1, further comprising:
determining noise scores for the plurality of suspect devices, the noise scores indicating the likelihood of the devices causing noise above a noise threshold and/or the likelihood of the devices being in proximity of a point of entry of noise into the network; and
providing the noise scores.

14. The method of claim 13, wherein determining noise scores for the plurality of suspect devices includes:
assigning weights to a plurality of network parameters for the plurality of suspect devices; and
calculating weight-adjusted noise scores for the plurality of suspect devices, the weight-adjusted noise scores indicating the likelihood of the devices causing noise above a noise threshold and/or the likelihood of the devices being in proximity of a point of entry of noise into the network.

15. The method of claim 14, wherein the plurality of network parameters are selected from among: (a) Codeword Error Rate, (b) Micro Reflection Level, (c) CM Pre-Equalized Frequency Response, (d) CMTS CM Equalized Frequency Response, (e) Main Tap Ratio, (f) Non Main Tap Energy to Total Tap Energy Ratio, (g) Power Level, (h) Power Level to MTR Ratio, (i) Power Level to NMTER Ratio, (j) Power Level to TTE Total Tap Energy Ratio, (k) TTE Total Tap Energy, (l) Non Main Individual Tap Energy, (m) Signal to Noise Ratio, (n) SNR spike level above certain threshold over time, and (o) SNR spike count above certain threshold over time for a period of time.

16. The method of claim 13, wherein determining noise scores for the plurality of suspect devices includes:
providing a plurality of network parameters for the plurality of suspect devices to a logistic regression model to calculate the noise scores for the plurality of devices.

17. The method of claim 13, wherein determining noise scores for the plurality of suspect devices includes:
providing a plurality of network parameters for the plurality of suspect devices to a neural network machine learning model to calculate the noise scores for the plurality of devices.

18. A non-transitory computer-readable storage medium storing one or more programs for noise analysis in a network, the one or more programs configured to be executed by one or more processors of an electronic device, and the one or more programs including instructions for:
determining upstream SNR values for a plurality of upstream channels;
identifying a noisy upstream channel based on whether the determined upstream SNR values for channels of the plurality of upstream channels meet a noisy channel criteria; and
identifying a plurality of suspect devices associated with the noisy upstream channel based on respective devices of the plurality of suspect devices meeting a set of one or more suspect criteria, wherein the set of one or more suspect criteria includes a channel criterion that is met for a respective device when the respective device has communicated on the noisy upstream channel.

19. The non-transitory computer-readable storage medium of claim 18, wherein the set of one or more suspect criteria includes an SNR (signal-to-noise ratio) standard deviation criterion that is met for the respective device when a determined SNR standard deviation value for the respective device exceeds an SNR standard deviation threshold.

20. The non-transitory computer-readable storage medium of claim 18, further comprising:
determining whether a quantity of devices of the plurality of suspect devices meets a quantity metric;
in accordance with a determination that the quantity of devices of the plurality of suspect devices does not meet the quantity metric:
adjusting one or more of:
an upstream transmit power level threshold,
an upstream transmit power level standard deviation threshold,
an NMTER (non-main tap energy to total tap energy ratio) threshold,
an NMTER standard deviation threshold,
an NMITE (non-main tap individual tap energy) threshold,
an SNR threshold,
an SNR standard deviation threshold, and
a CER threshold; and
subsequent to the adjusting, updating the identified plurality of suspect devices based on respective devices of the plurality of devices meeting the set of one or more suspect criteria with at least one adjusted threshold value.

21. The non-transitory computer-readable storage medium of claim 18, further comprising:
determining noise scores for the plurality of suspect devices, the noise scores indicating the likelihood of the devices causing noise above a noise threshold and/or the likelihood of the devices being in proximity of a point of entry of noise into the network; and
providing the noise scores.

22. The non-transitory computer-readable storage medium of claim 21, wherein determining noise scores for the plurality of suspect devices includes:
assigning weights to a plurality of network parameters for the plurality of suspect devices; and
calculating weight-adjusted noise scores for the plurality of suspect devices, the weight-adjusted noise scores indicating the likelihood of the devices causing noise above a noise threshold and/or the likelihood of the devices being in proximity of a point of entry of noise into the network.

23. The non-transitory computer-readable storage medium of claim 21, wherein determining noise scores for the plurality of suspect devices includes:
providing a plurality of network parameters for the plurality of suspect devices to a logistic regression model to calculate the noise scores for the plurality of devices.

24. The non-transitory computer-readable storage medium of claim 21, wherein determining noise scores for the plurality of suspect devices includes:
providing a plurality of network parameters for the plurality of suspect devices to a neural network machine learning model to calculate the noise scores for the plurality of devices.

25. An electronic device, comprising:
one or more processors; and
memory storing one or more programs for noise analysis in a network, the one or more programs configured to be executed by the one or more processors, and the one or more programs including instructions for:
determining upstream SNR values for a plurality of upstream channels;
identifying a noisy upstream channel based on whether the determined upstream SNR values for channels of the plurality of upstream channels meet a noisy channel criteria; and
identifying a plurality of suspect devices associated with the noisy upstream channel based on respective devices of the plurality of suspect devices meeting a set of one or more suspect criteria, wherein the set of one or more suspect criteria includes a channel criterion that is met for a respective device when the respective device has communicated on the noisy upstream channel.

26. The electronic device of claim 25, wherein the set of one or more suspect criteria includes an SNR (signal-to-noise ratio) standard deviation criterion that is met for the respective device when a determined SNR standard deviation value for the respective device exceeds an SNR standard deviation threshold.

27. The electronic device of claim 25, further comprising:
determining whether a quantity of devices of the plurality of suspect devices meets a quantity metric;
in accordance with a determination that the quantity of devices of the plurality of suspect devices does not meet the quantity metric:
adjusting one or more of:
an upstream transmit power level threshold,
an upstream transmit power level standard deviation threshold,
an NMTER (non-main tap energy to total tap energy ratio) threshold,
an NMTER standard deviation threshold,
an NMITE (non-main tap individual tap energy) threshold,
an SNR threshold,
an SNR standard deviation threshold, and
a CER threshold; and
subsequent to the adjusting, updating the identified plurality of suspect devices based on respective devices of the plurality of devices meeting the set of one or more suspect criteria with at least one adjusted threshold value.

28. The electronic device of claim 25, further comprising:
determining noise scores for the plurality of suspect devices, the noise scores indicating the likelihood of the devices causing noise above a noise threshold and/or the likelihood of the devices being in proximity of a point of entry of noise into the network; and
providing the noise scores.

29. The electronic device of claim 28, wherein determining noise scores for the plurality of suspect devices includes:
assigning weights to a plurality of network parameters for the plurality of suspect devices; and
calculating weight-adjusted noise scores for the plurality of suspect devices, the weight-adjusted noise scores indicating the likelihood of the devices causing noise above a noise threshold and/or the likelihood of the devices being in proximity of a point of entry of noise into the network.

30. The electronic device of claim 28, wherein determining noise scores for the plurality of suspect devices includes:
providing a plurality of network parameters for the plurality of suspect devices to a logistic regression model to calculate the noise scores for the plurality of devices.

31. The electronic device of claim 28, wherein determining noise scores for the plurality of suspect devices includes:
providing a plurality of network parameters for the plurality of suspect devices to a neural network machine learning model to calculate the noise scores for the plurality of devices.

32. A method for noise localization in a network, comprising:
identifying one or more channels that are affected by upstream noise on the network;
identifying a plurality of devices on the network that are attached to the one or more channels that are affected by upstream noise;
displaying a map;
subsequent to identifying the one or more channels that are affected by upstream noise:
determining, for at least two devices of the plurality of devices that are attached to the one or more channels, respective noise scores; and
subsequent to determining the respective noise scores, displaying, on the map, visual indications of the at least two devices of the plurality of devices that are attached to the one or more channels, wherein:
in accordance with a determination that the determined noise score of a respective device is within a first noise score range, the visual indication of the respective device has a first characteristic without having a second characteristic; and
in accordance with a determination that the determined noise score of the respective device is within a second noise score range, the visual indication of the respective device has the second characteristic without having the first characteristic.

33. The method of claim 32, wherein determining respective noise scores includes determining respective downstream noise scores for the respective devices.

34. The method of claim 32, wherein determining respective noise scores includes determining respective upstream noise scores for the respective devices.

35. The method of claim 32, wherein determining respective noise scores includes accessing SNR values for the respective devices.

36. The method of claim 32, wherein determining respective noise scores includes using a Noise Spectral Density for the respective devices.

37. The method of claim 32, wherein determining respective noise scores includes using a full band spectrum for the respective devices.

38. The method of claim 32, further comprising:
identifying a first area as including a first noise source.

39. The method of claim:
wherein the at least two respective devices are at least three respective devices of the plurality of devices that are attached to the one or more channels; and
wherein displaying, on the map, visual indications of the at least two respective devices of the plurality of devices that are attached to the one or more channels includes:
in accordance with a determination that the determined noise score of the respective device is within a third noise score range, the visual indication of the respective device has a third characteristic without having the first characteristics and without having the second characteristic.

40. The method of claim 32, further comprising:
identifying a second area as including a second noise source.

41. The method of claim 32, wherein the visual indications of the respective devices of the plurality of devices that are attached to the one or more channels are based on values according to the proximity of the respective devices to a source noise.

42. The method of claim 32, further comprising:
determining, for at least the two devices of the plurality of devices that are attached to the one or more channels, respective noise scores for a plurality of times; and
storing the respective noise scores for the plurality of times.

43. A non-transitory computer-readable storage medium storing one or more programs for noise localization in a network, the one or more programs configured to be executed by one or more processors of an electronic device with a display, and the one or more programs including instructions for:
identifying one or more channels that are affected by upstream noise on the network;
identifying a plurality of devices on the network that are attached to the one or more channels that are affected by upstream noise;
displaying a map;
subsequent to identifying the one or more channels that are affected by upstream noise:
determining, for at least two devices of the plurality of devices that are attached to the one or more channels, respective noise scores; and
subsequent to determining the respective noise scores, displaying, on the map, visual indications of the at least two devices of the plurality of devices that are attached to the one or more channels, wherein:
in accordance with a determination that the determined noise score of a respective device is within a first noise score range, the visual indication of the respective device has a first characteristic without having a second characteristic; and
in accordance with a determination that the determined noise score of the respective device is within a second noise score range, the visual indication of the respective device has the second characteristic without having the first characteristic.

44. The non-transitory computer-readable storage medium of claim 43, wherein determining respective noise scores includes determining respective upstream noise scores for the respective devices.

45. The non-transitory computer-readable storage medium of claim 43:
wherein the at least two respective devices are at least three respective devices of the plurality of devices that are attached to the one or more channels; and
wherein displaying, on the map, visual indications of the at least two respective devices of the plurality of devices that are attached to the one or more channels includes:
in accordance with a determination that the determined noise score of the respective device is within a third noise score range, the visual indication of the respective device has a third characteristic without having the first characteristics and without having the second characteristic.

46. The non-transitory computer-readable storage medium of claim 43, wherein the visual indications of the respective devices of the plurality of devices that are attached to the one or more channels are based on values according to the proximity of the respective devices to a source noise.

47. The non-transitory computer-readable storage medium of claim 43, further comprising:
determining, for at least the two devices of the plurality of devices that are attached to the one or more channels, respective noise scores for a plurality of times; and
storing the respective noise scores for the plurality of times.

48. An electronic device, comprising:
a display;
one or more processors; and
memory storing one or more programs for noise localization in a network, the one or more programs configured to be executed by the one or more processors, and the one or more programs including instructions for:
identifying one or more channels that are affected by upstream noise on the network;
identifying a plurality of devices on the network that are attached to the one or more channels that are affected by upstream noise;
displaying a map;
subsequent to identifying the one or more channels that are affected by upstream noise:
determining, for at least two devices of the plurality of devices that are attached to the one or more channels, respective noise scores; and
subsequent to determining the respective noise scores, displaying, on the map, visual indications of the at least two devices of the plurality of devices that are attached to the one or more channels, wherein:
in accordance with a determination that the determined noise score of a respective device is within a first noise score range, the visual indication of the respective device has a first characteristic without having a second characteristic; and
in accordance with a determination that the determined noise score of the respective device is within a second noise score range, the visual indication of the respective device has the second characteristic without having the first characteristic.

49. The electronic device of claim 40, wherein determining respective noise scores includes determining respective upstream noise scores for the respective devices.

50. The electronic device of claim 48:
wherein the at least two respective devices are at least three respective devices of the plurality of devices that are attached to the one or more channels; and
wherein displaying, on the map, visual indications of the at least two respective devices of the plurality of devices that are attached to the one or more channels includes:
in accordance with a determination that the determined noise score of the respective device is within a third noise score range, the visual indication of the respective device has a third characteristic without having the first characteristics and without having the second characteristic.

51. The electronic device of claim 48, wherein the visual indications of the respective devices of the plurality of devices that are attached to the one or more channels are based on values according to the proximity of the respective devices to a source noise.

52. The electronic device of claim 48, wherein the one or more programs include further instructions for:
    determining, for at least the two devices of the plurality of devices that are attached to the one or more channels, respective noise scores for a plurality of times; and
    storing the respective noise scores for the plurality of times.

53. A method for analyzing a network, comprising:
    concurrently displaying:
       a graphical representation of a network quality metric graphed against a first duration of time for a signal; and
       a map of an area, wherein the map includes concurrent display of:
          one or more geographical elements of the area that are not network devices, and
          a plurality of network devices;
    while displaying the graphical representation of the network quality metric for the signal, receiving input selecting a first time that is within the first duration of time; and
    in response to receiving the input selecting the first time, updating the map of the area to change a visual characteristic of at least some of the displayed plurality of network devices based on a respective noise score for the corresponding network devices at the selected first time.

54. The method of claim 53, wherein the respective noise score for a network device is determined based on a plurality of network parameters, the plurality of network parameters including a first network parameter obtained directly from the network device and a second network parameter obtained by analyzing variations in a network parameter of the network device over time.

55. The method of claim 53, wherein the respective noise score for a network device is determined based on a plurality of network parameters, the plurality of network parameters including a first network parameter obtained directly from the network device and a third network parameter obtained by analyzing variations in a network parameter of the network device over multiple channel frequencies.

56. The method of claim 53, wherein the respective noise score for a network device is determined based on a plurality of network parameters, the plurality of network parameters including a first network parameter obtained directly from the network device and a fourth network parameter obtained by analyzing a dependency or correlation between at least two network parameters of the network device.

57. The method of claim 53, wherein updating the map of the area to change a visual characteristic of at least some of the displayed plurality of network devices based on the noise score for the corresponding network devices at the selected first time comprises:
    determining a respective noise score for each of the plurality of network devices for the selected first time;
    determining whether the respective noise score for each respective network devices of the plurality of network devices meets a noise score criteria;
    updating the map of the area such that:
       respective network devices of the plurality of network devices that meet the device noise score criteria are displayed using a first visual appearance, and
       respective network devices of the plurality of network devices that do not meet the noise score criteria are displayed using a second visual appearance different from the first visual appearance.

58. The method of claim 53, wherein updating the map of the area to change a visual characteristic of at least some of the displayed plurality of network devices includes changing the visual characteristic of at least some network devices and maintaining the visual characteristic of at least some network devices.

59. The method of claim 53, further comprising:
    receiving selection of a network device of the plurality of network devices; and
    in response to receiving selection of the network device, concurrently displaying two or more of:
       a MAC address of the network device,
       a street address of the network device, and
       an account number of the network device.

60. The method of claim 53, further comprising:
    displaying, concurrently with the graphical representation of a network quality metric graphed against time for a signals, second graphical representation of the network quality metric graphed against a second duration of time, wherein the second duration of time includes the first duration of time, and wherein the second duration of time is longer than the first duration of time.

61. The method of claim 53, further comprising:
    displaying, concurrently with the graphical representation of the network quality metric for the signal, a graphical representation of the network quality metric graphed against the first duration of time for a second signal.

62. The method of claim 61, wherein:
    the graphical representation of the network quality metric for the signal is in a first color; and
    the graphical representation of the network quality metric for the second signal is in a second color, the second color being different from the first color.

63. The method of claim 53, further comprising:
    while displaying the graphical representation of the network quality metric for the signal and the map of the area, receiving input selecting a second time that is within the first duration of time; and
    in response to receiving the input selecting the second time, displaying a second map of the area, concurrently with the first map of the area, that includes at least some of the displayed plurality of network devices with a visual characteristic based on the respective noise score for the corresponding network devices at the selected second time.

64. The method of claim 53, wherein a respective noise score for a respective network device is calculated based on a make of the network device.

65. The method of claim 53, further comprising:
    determining a respective noise score for a respective network device for a time includes:
       determining a noise score type that is currently selected;
       in accordance with a determination that a first noise score type is currently selected:
          using, based on the first noise score type, a first set of network parameters for the respective network device for the time to calculate the respective noise score;
       in accordance with a determination that a second noise score type is currently selected:
          using, based on the second noise score type, a second set of network parameters for the respective network device for the time to calculate the respective noise score.

66. The method of claim 65, further comprising:
subsequent to determining the respective noise score types for the respective devices and subsequent to updating the map of the area to change the visual characteristic of at least some of the displayed plurality of network devices based on the respective noise score for the corresponding network devices at the selected first time, receiving input to change the noise score type; and
in response to receiving input to change the noise score type, updating the map of the area to change the visual characteristic of at least some of the displayed plurality of network devices based on the updated respective noise score for the corresponding network devices at the selected time.

67. An electronic device, comprising:
one or more processors; and
memory storing one or more programs configured to be executed by the one or more processors, the one or more programs including instructions for:
concurrently displaying:
a graphical representation of a network quality metric graphed against a first duration of time for a signal; and
a map of an area, wherein the map includes concurrent display of:
one or more geographical elements of the area that are not network devices, and
a plurality of network devices;
while displaying the graphical representation of the network quality metric for the signal, receiving input selecting a first time that is within the first duration of time; and
in response to receiving the input selecting the first time, updating the map of the area to change a visual characteristic of at least some of the displayed plurality of network devices based on a respective noise score for the corresponding network devices at the selected first time.

68. The electronic device of claim 67, wherein the respective noise score for a network device is determined based on a plurality of network parameters, the plurality of network parameters including a first network parameter obtained directly from the network device and a second network parameter obtained by analyzing variations in a network parameter of the network device over time.

69. The electronic device of claim 67, wherein the respective noise score for a network device is determined based on a plurality of network parameters, the plurality of network parameters including a first network parameter obtained directly from the network device and a third network parameter obtained by analyzing variations in a network parameter of the network device over multiple channel frequencies.

70. The electronic device of claim 67, wherein the respective noise score for a network device is determined based on a plurality of network parameters, the plurality of network parameters including a first network parameter obtained directly from the network device and a fourth network parameter obtained by analyzing a dependency or correlation between at least two network parameters of the network device.

71. The electronic device of claim 67, wherein updating the map of the area to change a visual characteristic of at least some of the displayed plurality of network devices based on the noise score for the corresponding network devices at the selected first time comprises:
determining a respective noise score for each of the plurality of network devices for the selected first time;
determining whether the respective noise score for each respective network devices of the plurality of network devices meets a noise score criteria;
updating the map of the area such that:
respective network devices of the plurality of network devices that meet the device noise score criteria are displayed using a first visual appearance, and
respective network devices of the plurality of network devices that do not meet the noise score criteria are displayed using a second visual appearance different from the first visual appearance.

72. The electronic device of claim 67, wherein updating the map of the area to change a visual characteristic of at least some of the displayed plurality of network devices includes changing the visual characteristic of at least some network devices and maintaining the visual characteristic of at least some network devices.

73. The electronic device of claim 67, wherein the one or more programs include further instructions for:
while displaying the graphical representation of the network quality metric for the signal and the map of the area, receiving input selecting a second time that is within the first duration of time; and
in response to receiving the input selecting the second time, displaying a second map of the area, concurrently with the first map of the area, that includes at least some of the displayed plurality of network devices with a visual characteristic based on the respective noise score for the corresponding network devices at the selected second time.

74. The electronic device of claim 67, wherein a respective noise score for a respective network device is calculated based on a make of the network device.

75. The electronic device of claim 67, wherein the one or more programs include further instructions for:
determining a respective noise score for a respective network device for a time includes:
determining a noise score type that is currently selected;
in accordance with a determination that a first noise score type is currently selected:
using, based on the first noise score type, a first set of network parameters for the respective network device for the time to calculate the respective noise score;
in accordance with a determination that a second noise score type is currently selected:
using, based on the second noise score type, a second set of network parameters for the respective network device for the time to calculate the respective noise score.

76. The electronic device of claim 75, wherein the one or more programs include further instructions for:
subsequent to determining the respective noise score types for the respective devices and subsequent to updating the map of the area to change the visual characteristic of at least some of the displayed plurality of network devices based on the respective noise score for the corresponding network devices at the selected first time, receiving input to change the noise score type; and
in response to receiving input to change the noise score type, updating the map of the area to change the visual characteristic of at least some of the displayed plurality of network devices based on the updated respective noise score for the corresponding network devices at the selected time.

77. A non-transitory computer-readable storage medium storing one or more programs configured to be executed by one or more processors of an electronic device, the one or more programs including instructions for:
concurrently displaying:
a graphical representation of a network quality metric graphed against a first duration of time for a signal; and
a map of an area, wherein the map includes concurrent display of:
one or more geographical elements of the area that are not network devices, and
a plurality of network devices;
while displaying the graphical representation of the network quality metric for the signal, receiving input selecting a first time that is within the first duration of time; and
in response to receiving the input selecting the first time, updating the map of the area to change a visual characteristic of at least some of the displayed plurality of network devices based on a respective noise score for the corresponding network devices at the selected first time.

78. The non-transitory computer-readable storage medium of claim 77, wherein the respective noise score for a network device is determined based on a plurality of network parameters, the plurality of network parameters including a first network parameter obtained directly from the network device and a second network parameter obtained by analyzing variations in a network parameter of the network device over time.

79. The non-transitory computer-readable storage medium of claim 77, wherein the respective noise score for a network device is determined based on a plurality of network parameters, the plurality of network parameters including a first network parameter obtained directly from the network device and a third network parameter obtained by analyzing variations in a network parameter of the network device over multiple channel frequencies.

80. The non-transitory computer-readable storage medium of claim 77, wherein the respective noise score for a network device is determined based on a plurality of network parameters, the plurality of network parameters including a first network parameter obtained directly from the network device and a fourth network parameter obtained by analyzing a dependency or correlation between at least two network parameters of the network device.

81. The non-transitory computer-readable storage medium of claim 77, wherein updating the map of the area to change a visual characteristic of at least some of the displayed plurality of network devices based on the noise score for the corresponding network devices at the selected first time comprises:
determining a respective noise score for each of the plurality of network devices for the selected first time;
determining whether the respective noise score for each respective network devices of the plurality of network devices meets a noise score criteria;
updating the map of the area such that:
respective network devices of the plurality of network devices that meet the device noise score criteria are displayed using a first visual appearance, and
respective network devices of the plurality of network devices that do not meet the noise score criteria are displayed using a second visual appearance different from the first visual appearance.

82. The non-transitory computer-readable storage medium of claim 77, wherein updating the map of the area to change a visual characteristic of at least some of the displayed plurality of network devices includes changing the visual characteristic of at least some network devices and maintaining the visual characteristic of at least some network devices.

83. The non-transitory computer-readable storage medium of claim 77, wherein the one or more programs include further instructions for:
while displaying the graphical representation of the network quality metric for the signal and the map of the area, receiving input selecting a second time that is within the first duration of time; and
in response to receiving the input selecting the second time, displaying a second map of the area, concurrently with the first map of the area, that includes at least some of the displayed plurality of network devices with a visual characteristic based on the respective noise score for the corresponding network devices at the selected second time.

84. The non-transitory computer-readable storage medium of claim 77, wherein a respective noise score for a respective network device is calculated based on a make of the network device.

85. The non-transitory computer-readable storage medium of claim 77, wherein the one or more programs include further instructions for:
determining a respective noise score for a respective network device for a time includes:
determining a noise score type that is currently selected;
in accordance with a determination that a first noise score type is currently selected:
using, based on the first noise score type, a first set of network parameters for the respective network device for the time to calculate the respective noise score:
in accordance with a determination that a second noise score type is currently selected:
using, based on the second noise score type, a second set of network parameters for the respective network device for the time to calculate the respective noise score.

86. The non-transitory computer-readable storage medium of claim 85, wherein the one or more programs include further instructions for:
subsequent to determining the respective noise score types for the respective devices and subsequent to updating the map of the area to change the visual characteristic of at least some of the displayed plurality of network devices based on the respective noise score for the corresponding network devices at the selected first time, receiving input to change the noise score type; and
in response to receiving input to change the noise score type, updating the map of the area to change the visual characteristic of at least some of the displayed plurality of network devices based on the updated respective noise score for the corresponding network devices at the selected time.

87. A method for analyzing a network, comprising:
concurrently displaying:
- a graphical representation of a network quality metric graphed against a first duration of time for a signal; and
- a map of an area, wherein the map includes concurrent display of:
  - one or more geographical elements of the area that are not network devices, and
  - a plurality of network devices;

while displaying the graphical representation of the network quality metric for the signals, receiving first input selecting a first time that is within the first duration of time; and in response to receiving the first input, displaying a first visual indicator corresponding to the first time in the graphical representation of the network quality metric;

while displaying the graphical representation of the network quality metric for the signals, receiving second input selecting a second time, different from the first time, that is within the first duration of time;

in response to receiving the second input, displaying a second visual indicator corresponding to the second time in the graphical representation of the network quality metric; and subsequent to receiving the first input and the second input:
- determining a change in a noise score for each of the plurality of network devices between the first time and the second time;
- determining whether the respective change in the noise score for each respective network device of the plurality of network devices meets a noise score change criteria;
- displaying, based on the determinations of whether respective changes in the noise scores meet the noise score change criteria, the map of the area such that:
  - respective network devices of the plurality of network devices that meet the noise score change criteria are displayed using a first visual appearance.

88. The method of claim 87, further comprising:
subsequent to receiving the first input and the second input:
- displaying, based on the determinations of whether respective changes in the noise scores meet the noise score change criteria, the map of the area such that:
  - respective network devices of the plurality of network devices that do not meet the noise score change criteria are displayed using a second visual appearance different from the first visual appearance.

89. The method of claim 87, further comprising:
subsequent to receiving the first input and the second input:
- displaying, based on the determinations of whether respective changes in the noise scores meet the noise score change criteria, the map of the area such that:
  - respective network devices of the plurality of network devices that do not meet the noise score change criteria are not displayed.

90. The method of claim 87,
wherein the noise score change criteria is met for a respective network device when a change in the noise score of the network device between the first time and the second time exceeds a threshold change value; and
wherein the threshold change value is provided by user input.

91. The method of claim 87,
wherein the noise score change criteria is met for a respective network device when the respective network device is categorized has having an amount of change in the noise score of the network device between the first time and the second time that falls within a top number of network devices; and
wherein the threshold change value is provided by user input.

92. The method of claim 87, wherein the visual appearance of respective network devices of the plurality of network devices are displayed using a variable value, wherein the variable value is based on a magnitude of the change in the noise score of the network device between the first time and the second time.

93. The method of claim 87, further comprising:
receiving selection of a network device of the plurality of network devices; and
in response to receiving selection of the network devices, concurrently displaying two or more of:
- a MAC address of the network device,
- a street address of the network device, and
- an account number of the network device.

94. The method of claim 87, further comprising:
displaying, concurrently with the graphical representation of the network quality metric graphed against time for the signal, second graphical representation of the network quality metric graphed against a second duration of time, wherein the second duration of time includes the first duration of time, and wherein the second duration of time is longer than the first duration of time.

95. The method of claim 87, further comprising:
displaying, concurrently with the graphical representation of the network quality metric for the signal, a graphical representation of the network quality metric graphed against the first duration of time for a second signal.

96. The method of claim 95, wherein:
the graphical representation of the network quality metric for the signal is in a first color; and
the graphical representation of the network quality metric for the second signal is in a second color, the second color being different from the first color.

97. The method of claim 87, wherein a respective noise score for a respective network device is calculated based on a make of the network device.

98. The method of claim 87, further comprising:
determining a respective noise score for a respective network device for a time includes:
- determining a noise score type that is currently selected;
- in accordance with a determination that a first noise score type is currently selected:
  - using, based on the first noise score type, a first set of network parameters for the respective network device for the time to calculate the respective noise score;
- in accordance with a determination that a second noise score type is currently selected:
  - using, based on the second noise score type, a second set of network parameters for the respective network device for the time to calculate the respective noise score.

99. The method of claim 98, further comprising:
subsequent to displaying, based on the determinations of whether respective changes in the noise scores meet the noise score change criteria, the map of the area, receiving input to change the noise score type; and in response to receiving input to change the noise score type:
- determining updated respective noise scores for respective network devices for the first time and the second time; and
- determining whether a respective change in the noise score for each respective network device of the plurality of network devices meets the noise score change criteria;
- updating, based on the determinations of whether respective changes in the noise scores meet the noise score change criteria, the map of the area to change the visual characteristic of at least some of the displayed plurality of network devices.

100. A device for analyzing a network, comprising:
one or more processors;
memory storing one or more programs configured to be executed by the one or more processors, the one or more programs including instructions for:
concurrently displaying:
- a graphical representation of a network quality metric graphed against a first duration of time for a signal; and
- a map of an area, wherein the map includes concurrent display of:
  - one or more geographical elements of the area that are not network devices, and
  - a plurality of network devices;
while displaying the graphical representation of the network quality metric for the signals, receiving first input selecting a first time that is within the first duration of time; and
in response to receiving the first input, displaying a first visual indicator corresponding to the first time in the graphical representation of the network quality metric;
while displaying the graphical representation of the network quality metric for the signals, receiving second input selecting a second time, different from the first time, that is within the first duration of time; and
in response to receiving the second input, displaying a second visual indicator corresponding to the second time in the graphical representation of the network quality metric;
subsequent to receiving the first input and the second input:
- determining a change in a noise score for each of the plurality of network devices between the first time and the second time;
- determining whether the respective change in the noise score for each respective network device of the plurality of network devices meets a noise score change criteria;
- displaying, based on the determinations of whether respective changes in the noise scores meet the noise score change criteria, the map of the area such that:
  - respective network devices of the plurality of network devices that meet the noise score change criteria are displayed using a first visual appearance.

101. The device of claim 100, wherein the one or more programs include further instructions for:
subsequent to receiving the first input and the second input:
- displaying, based on the determinations of whether respective changes in the noise scores meet the noise score change criteria, the map of the area such that:
  - respective network devices of the plurality of network devices that do not meet the noise score change criteria are displayed using a second visual appearance different from the first visual appearance.

102. The device of claim 100, wherein the one or more programs include further instructions for:
subsequent to receiving the first input and the second input:
- displaying, based on the determinations of whether respective changes in the noise scores meet the noise score change criteria, the map of the area such that:
  - respective network devices of the plurality of network devices that do not meet the noise score change criteria are not displayed.

103. The device of claim 100,
wherein the noise score change criteria is met for a respective network device when a change in the noise score of the network device between the first time and the second time exceeds a threshold change value; and
wherein the threshold change value is provided by user input.

104. The device of claim 100,
wherein the noise score change criteria is met for a respective network device when the respective network device is categorized has having an amount of change in the noise score of the network device between the first time and the second time that falls within a top number of network devices; and
wherein the threshold change value is provided by user input.

105. The device of claim 100, wherein the visual appearance of respective network devices of the plurality of network devices are displayed using a variable value, wherein the variable value is based on a magnitude of the change in the noise score of the network device between the first time and the second time.

106. The device of claim 100, wherein the one or more programs include further instructions for:
receiving selection of a network device of the plurality of network devices; and
in response to receiving selection of the network devices, concurrently displaying two or more of:
a MAC address of the network device,
a street address of the network device, and
an account number of the network device.

107. The device of claim 100, wherein the one or more programs include further instructions for:
displaying, concurrently with the graphical representation of the network quality metric graphed against time for the signal, second graphical representation of the network quality metric graphed against a second duration of time, wherein the second duration of time includes the first duration of time, and wherein the second duration of time is longer than the first duration of time.

108. The device of claim 100, wherein the one or more programs include further instructions for:
displaying, concurrently with the graphical representation of the network quality metric for the signal, a graphical representation of the network quality metric graphed against the first duration of time for a second signal.

109. The device of claim 100, wherein a respective noise score for a respective network device is calculated based on a make of the network device.

110. The device of claim 100, wherein the one or more programs include further instructions for:
    determining a respective noise score for a respective network device for a time includes:
        determining a noise score type that is currently selected;
        in accordance with a determination that a first noise score type is currently selected:
            using, based on the first noise score type, a first set of network parameters for the respective network device for the time to calculate the respective noise score:
        in accordance with a determination that a second noise score type is currently selected:
            using, based on the second noise score type, a second set of network parameters for the respective network device for the time to calculate the respective noise score.

111. The device of claim 110, wherein the one or more programs include further instructions for:
    subsequent to displaying, based on the determinations of whether respective changes in the noise scores meet the noise score change criteria, the map of the area, receiving input to change the noise score type; and
    in response to receiving input to change the noise score type:
        determining updated respective noise scores for respective network devices for the first time and the second time; and
        determining whether a respective change in the noise score for each respective network device of the plurality of network devices meets the noise score change criteria;
        updating, based on the determinations of whether respective changes in the noise scores meet the noise score change criteria, the map of the area to change the visual characteristic of at least some of the displayed plurality of network devices.

112. A non-transitory computer-readable storage medium storing one or more programs for analyzing a network, the one or more programs including instructions for:
    concurrently displaying:
        a graphical representation of a network quality metric graphed against a first duration of time for a signal; and
        a map of an area, wherein the map includes concurrent display of:
            one or more geographical elements of the area that are not network devices, and
            a plurality of network devices;
    while displaying the graphical representation of the network quality metric for the signals, receiving first input selecting a first time that is within the first duration of time; and
    in response to receiving the first input, displaying a first visual indicator corresponding to the first time in the graphical representation of the network quality metric;
    while displaying the graphical representation of the network quality metric for the signals, receiving second input selecting a second time, different from the first time, that is within the first duration of time; and
    in response to receiving the second input, displaying a second visual indicator corresponding to the second time in the graphical representation of the network quality metric;
    subsequent to receiving the first input and the second input:
        determining a change in a noise score for each of the plurality of network devices between the first time and the second time;
        determining whether the respective change in the noise score for each respective network device of the plurality of network devices meets a noise score change criteria;
        displaying, based on the determinations of whether respective changes in the noise scores meet the noise score change criteria, the map of the area such that:
            respective network devices of the plurality of network devices that meet the noise score change criteria are displayed using a first visual appearance.

113. The non-transitory computer-readable storage medium of claim 112, wherein the one or more programs including instructions for:
    subsequent to receiving the first input and the second input:
        displaying, based on the determinations of whether respective changes in the noise scores meet the noise score change criteria, the map of the area such that:
            respective network devices of the plurality of network devices that do not meet the noise score change criteria are displayed using a second visual appearance different from the first visual appearance.

114. The non-transitory computer-readable storage medium of claim 112, wherein the one or more programs including instructions for:
    subsequent to receiving the first input and the second input:
        displaying, based on the determinations of whether respective changes in the noise scores meet the noise score change criteria, the map of the area such that:
            respective network devices of the plurality of network devices that do not meet the noise score change criteria are not displayed.

115. The non-transitory computer-readable storage medium of claim 112,
    wherein the noise score change criteria is met for a respective network device when a change in the noise score of the network device between the first time and the second time exceeds a threshold change value; and
    wherein the threshold change value is provided by user input.

116. The non-transitory computer-readable storage medium of claim 112,
    wherein the noise score change criteria is met for a respective network device when the respective network device is categorized has having an amount of change in the noise score of the network device between the first time and the second time that falls within a top number of network devices; and
    wherein the threshold change value is provided by user input.

117. The non-transitory computer-readable storage medium of claim 112, wherein the visual appearance of respective network devices of the plurality of network devices are displayed using a variable value, wherein the variable value is based on a magnitude of the change in the noise score of the network device between the first time and the second time.

118. The non-transitory computer-readable storage medium of claim 112, wherein the one or more programs including instructions for:
receiving selection of a network device of the plurality of network devices; and
in response to receiving selection of the network devices, concurrently displaying two or more of:
a MAC address of the network device,
a street address of the network device, and
an account number of the network device.

119. The non-transitory computer-readable storage medium of claim 112, wherein the one or more programs including instructions for:
displaying, concurrently with the graphical representation of the network quality metric graphed against time for the signal, second graphical representation of the network quality metric graphed against a second duration of time, wherein the second duration of time includes the first duration of time, and wherein the second duration of time is longer than the first duration of time.

120. The non-transitory computer-readable storage medium of claim 112, wherein the one or more programs including instructions for:
displaying, concurrently with the graphical representation of the network quality metric for the signal, a graphical representation of the network quality metric graphed against the first duration of time for a second signal.

121. The non-transitory computer-readable storage medium of claim 112, wherein a respective noise score for a respective network device is calculated based on a make of the network device.

122. The non-transitory computer-readable storage medium of claim 112, wherein the one or more programs including instructions for:
determining a respective noise score for a respective network device for a time includes:
determining a noise score type that is currently selected;
in accordance with a determination that a first noise score type is currently selected:
using, based on the first noise score type, a first set of network parameters for the respective network device for the time to calculate the respective noise score;
in accordance with a determination that a second noise score type is currently selected:
using, based on the second noise score type, a second set of network parameters for the respective network device for the time to calculate the respective noise score.

123. The non-transitory computer-readable storage medium of claim 122, wherein the one or more programs including instructions for:
subsequent to displaying, based on the determinations of whether respective changes in the noise scores meet the noise score change criteria, the map of the area, receiving input to change the noise score type; and
in response to receiving input to change the noise score type:
determining updated respective noise scores for respective network devices for the first time and the second time; and
determining whether a respective change in the noise score for each respective network device of the plurality of network devices meets the noise score change criteria;
updating, based on the determinations of whether respective changes in the noise scores meet the noise score change criteria, the map of the area to change the visual characteristic of at least some of the displayed plurality of network devices.

124. A method for analyzing a network, comprising:
determining a first time at which a first type of network impairment is negatively affecting the network;
determining a second time at which the first type of network impairment is not negatively affecting the network or is negatively affecting the network less than at the first time;
calculating, for each of a plurality of network devices of the network:
a first noise score for the first time using a first calculation;
a second noise score for the first time using a second calculation different from the first calculation;
a third noise score for the second time using the first calculation; and
a fourth noise score for the second time using the second calculation;
determining, for each of the plurality of network devices:
a first difference score by calculating a difference between the first noise score and the third noise score for the respective network device; and
a second difference score by calculating a difference between the second noise score and the fourth noise score for the respective network device;
identifying the first calculation as an indicator of the first type of network impairment when a subset of the plurality of network devices have first difference scores that exceed a threshold difference; and
identifying the second calculation as an indicator of the first type of network impairment when a subset of the plurality of network devices have second difference scores that exceed the threshold difference.

125. A device for analyzing a network, comprising:
one or more processors; and
memory storing one or more programs configured to be executed by the one or more processors, the one or more programs including instructions for:
determining a first time at which a first type of network impairment is negatively affecting the network;
determining a second time at which the first type of network impairment is not negatively affecting the network or is negatively affecting the network less than at the first time;
calculating, for each of a plurality of network devices of the network:
a first noise score for the first time using a first calculation;
a second noise score for the first time using a second calculation different from the first calculation;
a third noise score for the second time using the first calculation; and
a fourth noise score for the second time using the second calculation;
determining, for each of the plurality of network devices:
a first difference score by calculating a difference between the first noise score and the third noise score for the respective network device; and a second difference score by calculating a difference between the second noise score and the fourth noise score for the respective network device;

identifying the first calculation as an indicator of the first type of network impairment when a subset of the plurality of network devices have first difference scores that exceed a threshold difference; and identifying the second calculation as an indicator of the first type of network impairment when a subset of the plurality of network devices have second difference scores that exceed the threshold difference.

126. A non-transitory computer-readable storage medium storing one or more programs configured to be executed by one or more processors of a device, the one or more programs including instructions for:

determining a first time at which a first type of network impairment is negatively affecting the network;

determining a second time at which the first type of network impairment is not negatively affecting the network or is negatively affecting the network less than at the first time;

calculating, for each of a plurality of network devices of the network:

a first noise score for the first time using a first calculation;

a second noise score for the first time using a second calculation different from the first calculation;

a third noise score for the second time using the first calculation; and a fourth noise score for the second time using the second calculation;

determining, for each of the plurality of network devices:

a first difference score by calculating a difference between the first noise score and the third noise score for the respective network device; and a second difference score by calculating a difference between the second noise score and the fourth noise score for the respective network device;

identifying the first calculation as an indicator of the first type of network impairment when a subset of the plurality of network devices have first difference scores that exceed a threshold difference; and identifying the second calculation as an indicator of the first type of network impairment when a subset of the plurality of network devices have second difference scores that exceed the threshold difference.

\* \* \* \* \*